United States Patent [19]

Taira et al.

[11] 4,047,175
[45] Sept. 6, 1977

[54] TELEVISION ANTENNA DIRECTING AND TRACKING SYSTEM FOR TELEVISION PROGRAM NETWORK BETWEEN AIR-BORNE AND GROUND OFFICES

[75] Inventors: Hideya Taira; Kuniaki Shimizu, both of Tokyo, Japan

[73] Assignee: Tokyo Keiki Company Limited, Tokyo, Japan

[21] Appl. No.: 663,529

[22] Filed: Mar. 3, 1976

[30] Foreign Application Priority Data

Mar. 5, 1975 Japan .................................. 50-26089
July 24, 1975 Japan .................................. 50-89641

[51] Int. Cl.² .............................................. G01S 3/04
[52] U.S. Cl. .................................. 343/100 CS; 325/4; 325/14; 342/117 R
[58] Field of Search ................. 343/100 CS, 117 R; 325/4, 14

[56] References Cited

U.S. PATENT DOCUMENTS 2,626,348 1/1953 Nobles .................................. 343/101
2,627,021 1/1953 Hansell et al. .................... 343/117 R

OTHER PUBLICATIONS

Electronics, Aug. 2, 1963, pp. 32, 33.

*Primary Examiner* — Maynard R. Wilbur
*Assistant Examiner* — Richard E. Berger

[57] ABSTRACT

This invention relates to a television antenna directing and tracking system for directing a television repeating or relaying antenna mounted on an aircraft toward a ground station. The air-borne office is provided with a coordinate transforming device for transforming the azimuth angle $\phi_A(t)$ and the elevation angle $\theta_A(t)$ which represent the direction of the aircraft with respect to the longitude and latitude of the globe or the globe coordinate into the azimuth angle $\phi_B(t)$ and the elevation angle $\theta_B(t)$ at the air-borne coordinate. The ground office is equipped with receiving means and tracking means and the air-borne office receives command signals regarding the azimuth angle $\phi_A(t)$ and the elevation angle $\theta_A(t)$ from the ground office. Further, the air-borne office is equipped with means for computing by itself the azimuth angle $\phi_A(t)$ and the elevation angle $\theta_A(t)$ based on the flight informations without the aid of the ground office.

11 Claims, 24 Drawing Figures

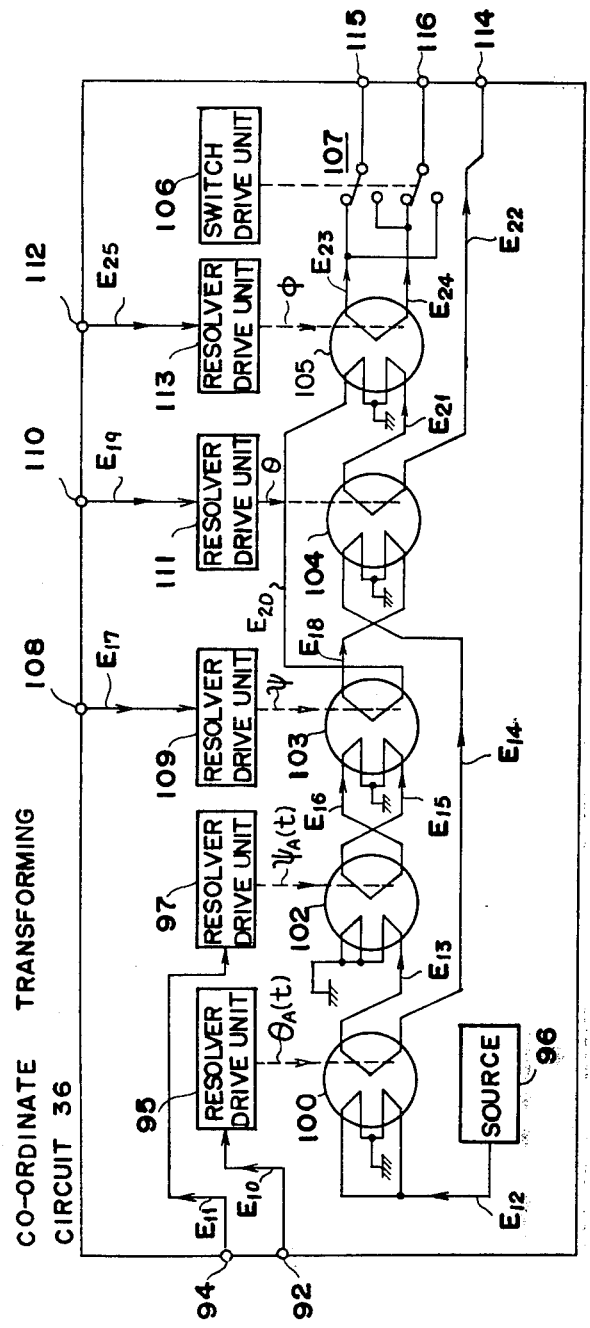

CIRCUIT SYMBOL OF RESOLVER

FLUX VALVE

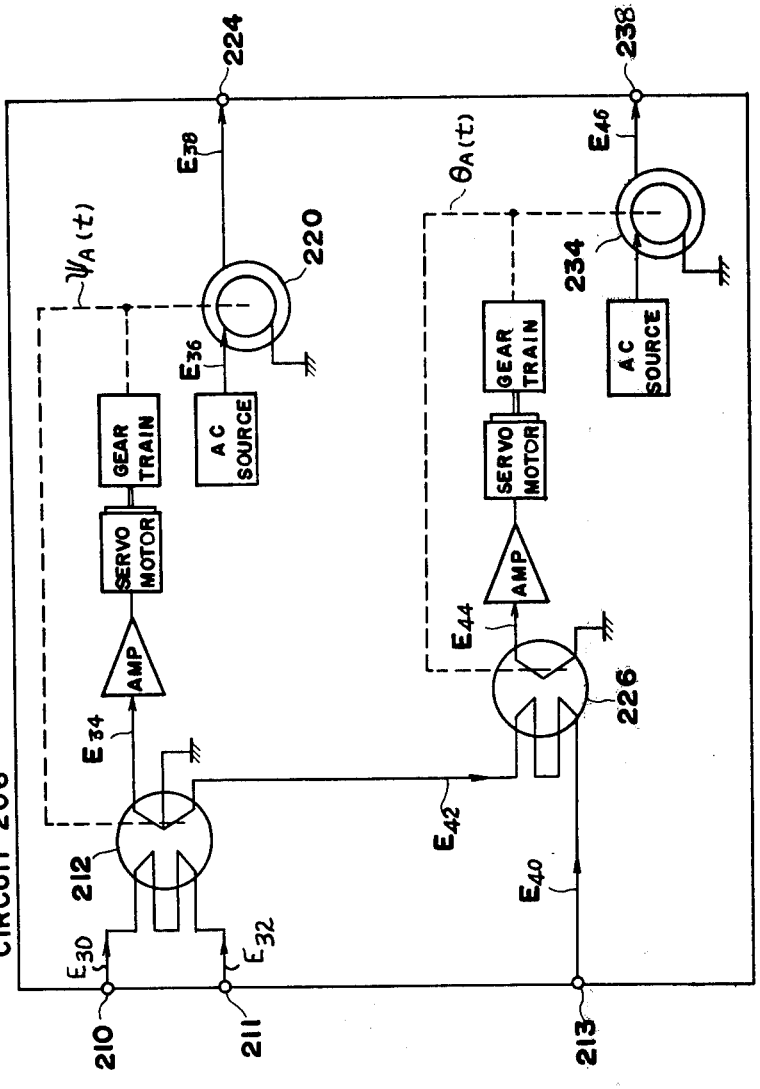

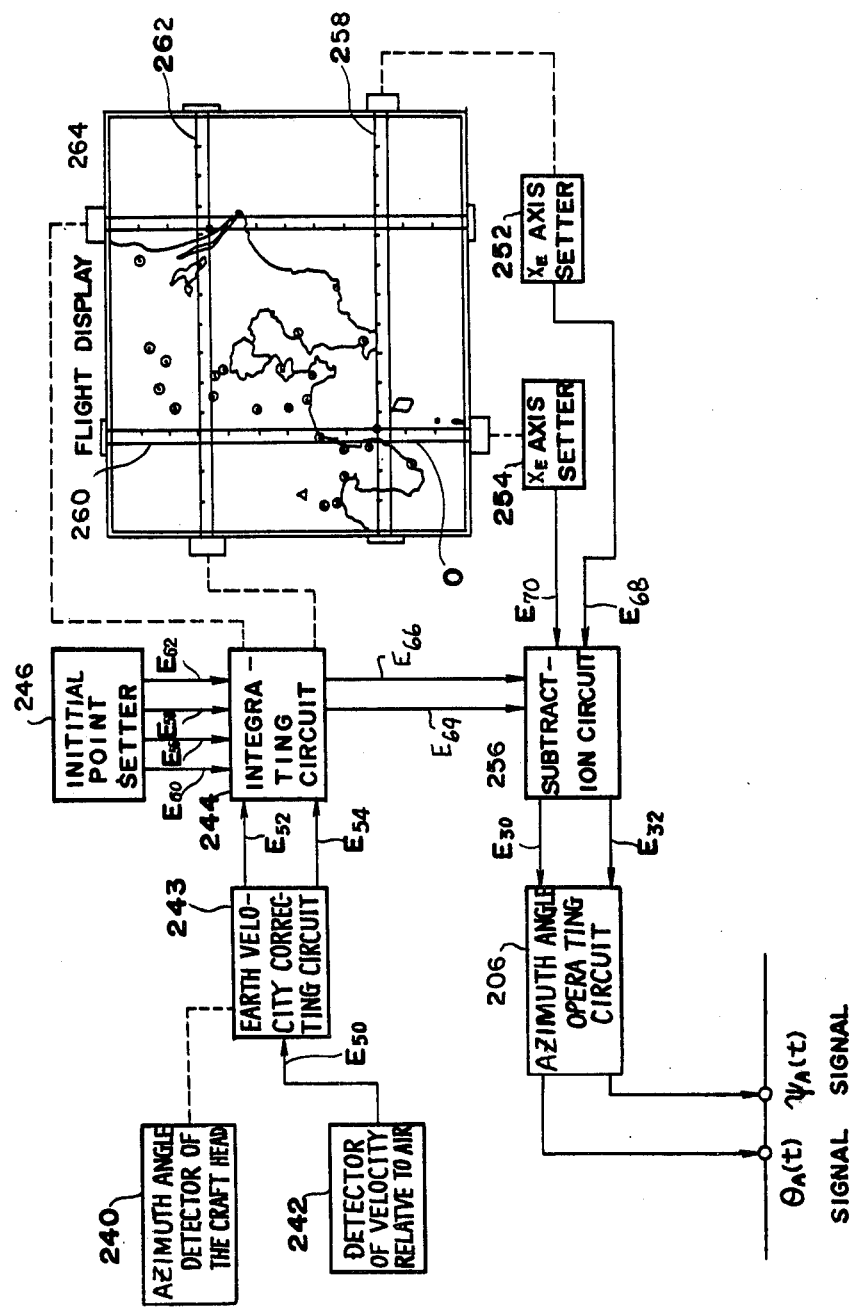

TELEVISION ANTENNA DIRECTING AND TRACKING SYSTEM FOR TELEVISION PROGRAM NETWORK BETWEEN AIR-BORNE AND GROUND OFFICES

BACKGROUND OF THE INVENTION

This invention relates to an automatic controlling and tracking system of the direction of a directive repeating antenna of a television repeating system, and more particularly to an automatic controlling and tracking system of the direction of a directive repeating antenna mounted on an aircraft which is used to send video signals photographed by an air-born television camera to a ground office.

Where television video signals are sent to a ground office from an aircraft in flight it is required to control the directive repeating antenna on the aircraft such that the antenna is always directed to the ground station. One difficult problem encountered in the control of the direction of the repeating antenna is that the coordinate of the ground office is determined by the longitude and the latitude of the globe whereas the aircraft coordinate that determines the direction of the repeating antenna is independent from the latitude and longitude of the globe (globe coordinate) accordingly, in order to automatically direct the air-borne repeating antenna to a definite direction toward the ground office it is necessary to determine the correlationship between the globe coordinate and the aircraft coordinate and to control the direction of the repeating antenna based on the correlationship so as to always cancel the variations in the coordinate caused by the motion of the aircraft.

According to one method of controlling the direction of the air-borne repeating antenna in a manner just described, the rolling and pitching angles of the craft detected by a vertical gyroscope mounted on the craft and the azimuth angle of the craft detected by an orientation gyroscope are used, because the relationship between the globe coordinate and the craft coordinate can be determined by the rolling angle, pitching angle and the orientation angle. For this reason, a stabilized platform which is automatically controlled so that the rolling and pitching angles are made to be always zero is mounted on the craft, such stabilized platform being used to realize the globe coordinate on the craft. By providing proper means for adjusting the orientation angle to a preset angle that indicates the desired ground office for the stabilized platform, it is possible to maintain the repeating antenna in a direction toward the desired ground office.

However, with such an automatic direction control system utilizing the stabilized platform on the aircraft, it is necessary to provide three control systems for the orientation angle, rolling angle and pitch angle for the purpose of controlling the attitude and orientation of the stabilized platform. However, in order to provide three degrees of freedom for the driving mechanism of the stabilized platform it is necessary to use a gimbal support having two degrees of freedom necessary to control at least the rolling angle and the pitching angle in the same manner as a vertical gyroscope. Accordingly, it is necessary to provide for one gimbal a driving mechanism for the other gimbal. In addition, it is necessary to use a plurality of slip rings and brushes for establishing electric circuits. Moreover, it is necessary to mount these gimbal mechanisms for supporting the repeating antenna on the outside of the craft so that the direction of the electric wave radiated by the repeating antenna will not be disturbed by the movement of the craft.

Accordingly, according to the commercial repeating system utilizing an air-borne repeating antenna it has been the practice to project a non-directive repeating antenna to the outside of the craft or to control only the horizontal position of the non-directive antenna by using above described stabilized platform. However, since the repeating antenna is non-directive, the repeating area is more limited than a case using a directive repeating antenna, for example, to an area within a circle having a radius of about 20 Km from the ground office. However, such system is disadvantageous in that the size of the control apparatus is bulky and complicated.

In the automatic direction control system of an air-borne repeating antenna, it is necessary to provide a ground control system for the ground office that tracks the movement of the aircraft and controls the direction of the receiving antenna in accordance with the movement of the aircraft. As such ground system for performing such tracking and reception it has been used a control system that controls the direction of the receiving antenna such that it is maintained in a direction giving the maximum receiving field intensity. However, in order to effectively receive the electric wave radiated by a non-directive repeating antenna it is necessary to use a large receiving antenna in order to obtain sufficiently large receiving field in intensity.

SUMMARY OF THE INVENTION

The prior art automatic direction control system involves problems caused by coordinate transforming means that realizes the globe coordinate on an aircraft, the tracking means and the receiving means in the ground station.

Accordingly, it is an object of this invention to provide a novel air-borne office and a novel ground office cooperating therewith for the automatic direction control system.

The air-borne office mounted on an aircraft comprises means for receiving a position information from the ground office, coordinate transforming means for giving two angle compoments that indicate the direction of the repeating antenna from the rolling angle, the pitching angle and the azimuth angle of the craft, and an antenna driving unit. Further, a television camera, and a video signal transmitter are mounted on the craft as the equipment for repeating television, informations. The position information receiving means gives the elevation angle and the azimuth angle on the globe coordinate that indicate the desired direction for the control of the repeating antenna. The coordinate transforming device transforms the coordinates of the elevation angle and azimuth angle in accordance with the rolling angle, the pitch angle and the orientation angle of the craft which vary from time to time so as to provide two angle components on the aircraft coordinate that always direct the repeating antenna in a definite direction toward the ground office. The coordinate transformer may be realized as an operation circuit utilizing a resolver. The antenna driving unit gives a rotary movement having two degrees of freedom to the repeating antenna and comprises a servo-loop that rotates the longitudinal and lateral axes of the antenna and a gear train. Further the antenna driving unit is provided with means for disenabling a dead point locking device which makes inoperative the control system when the repeating antenna is directed downward. The servo-loop of the antenna driving unit has a high response speed sufficient to follow up the variations in the rolling angle, the pitching angle and the orientation angle of the craft which vary in accordance with the movement of the craft.

The apparatus installed in the ground office comprises a tracking antenna for tracking the movement of the aircraft, a receiving antenna for receiving the waves of the television video signals, means for transforming the elevation angle and the azimuth angle of the tracking antenna into position information, and a transmitter including a transmitting antenna for transmitting the position informations to the aircraft. These apparatus in the ground office are old not only in such office but also in a navigation system but in order to realize the novel direction control system of this invention a special combination and particular data are used.

In another embodiment of this invention, the airborne office includes means for obtaining by itself the positional informations without the aid of the ground office. Such means may be constituted by an inertial navigating device mounted on the aircraft. The invention also provides means for obtaining positional information for an aircraft not provided with the inertial navigating device, in which case the positional informations are obtained by an operator which add weather informations such as wind pressure and direction to the informations obtained by an orientation gyroscope and speed meter on the craft.

According to still another embodiment of this invention the ground station utilized in an automatic direction control system wherein the aircraft is provided with an air-borne system which produces positional informations without the aid of the ground office has simpler construction than the above described ground office which is constructed to send the positional informations to the craft because the former type of the ground office is not required to be equipped with means for sending the azimuth angle and the elevation angle of the tracking antenna to the aircraft.

Thus, the television antenna automatic directing and tracking system of this invention broadens the repeating area to a circle having a radius of about 100 Km.

Accordingly, the principal object of this invention is to provide an improved automatic directing and tracking control system including an air-borne station and a ground station capable of automatically controlling at high accuracies the direction of a repeating antenna mounted on an aircraft and can widen the repeating area and improve the transmission characteristics of the repeating antenna.

Another object of this invention is to provide a coordinate transforming means that provide a set value of the direction of the repeating antenna of the air-borne station.

Still another object of this invention is to provide a novel television antenna automatic directing and tracking system capable of eliminating the dead point locking means of an antenna driving unit.

A further object of this invention is to provide a novel automatic gain control means always capable of giving a definite loop gain to the servo-loop contained in the antenna drive unit independently of the movement of the aircraft.

Another important object of this invention is to provide a novel method and apparatus of controlling the direction of the repeating antenna wherein the air-born station is provided with means for obtaining the set angle of the repeating antenna on the globe coordinate representing the positional information. Still another object of this invention is to provide a novel antenna direction controlling system wherein the air-borne station can obtain the positional information thus simplifying the construction of the ground station.

Yet another object of this invention is to provide a novel antenna direction control system wherein the air-borne station can produce the positional information by utilizing the equipment on the craft.

BRIEF DESCRIPTION OF THE DRAWINGS

In the accompanying drawings:

FIG. 4 is a connection diagram showing the detail of the coordinate transforming circuit;

FIG. 12 is a block diagram showing the detail of the construction of the azimuth angle operation circuit shown in FIG. 11;

FIG. 13 is a block diagram showing another example of the azimuth angle self setter;

DESCRIPTION OF THE PREFERRED EMBODIMENTS

Figure 1:
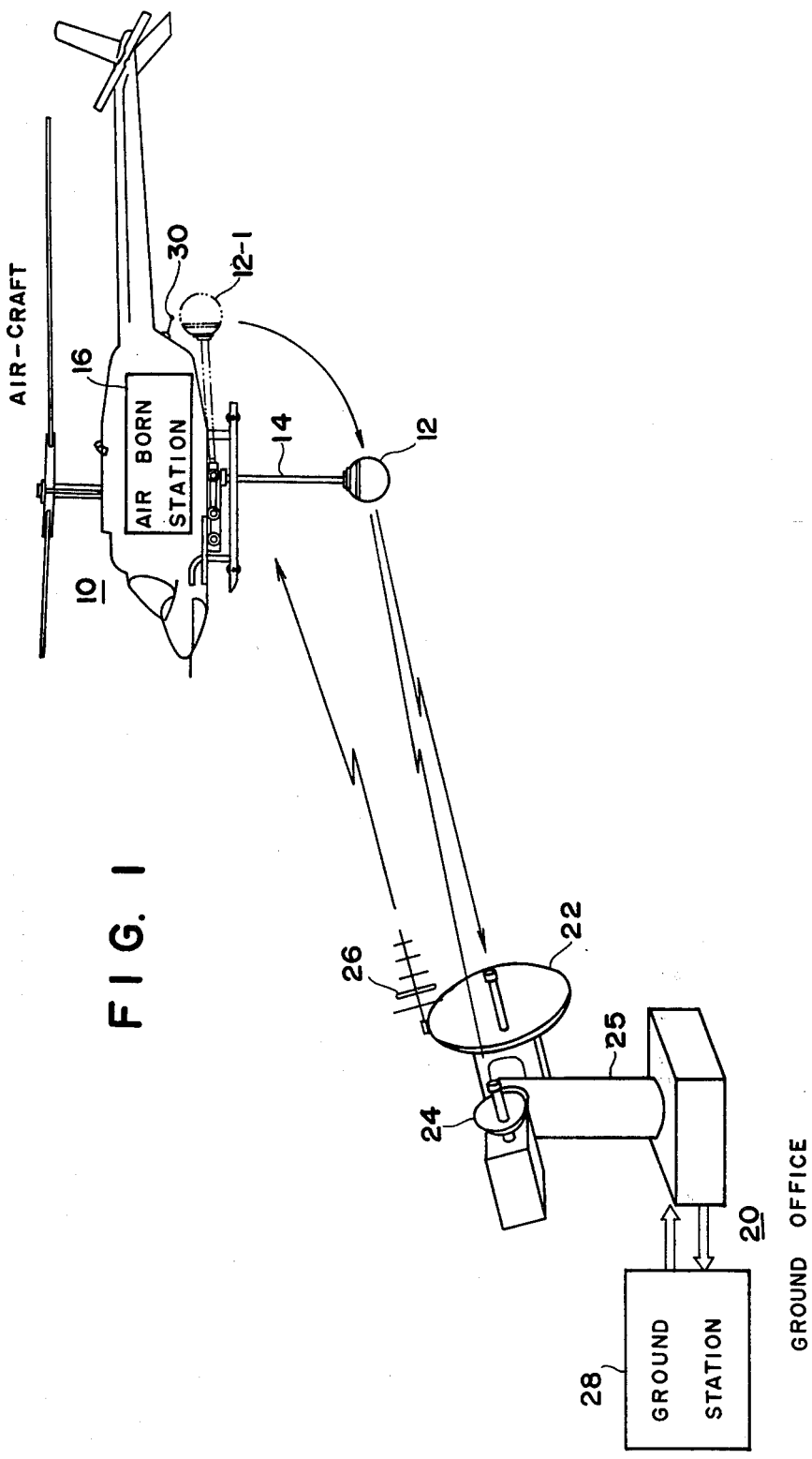
FIG. 1 is a diagrammatic representation of a ground station and a helicopter equipped with a television camera, the repeating system of the television video signals embodying the invention being applied between the ground station and the helicopter.

FIG. 1 of the accompanying drawing illustrates one embodiment of the novel television video signal repeating system of this invention as applied to a ground station and a helicopter carrying a television camera.

A repeating antenna 12 is secured to the lower end of a shaft 14 extending downwardly from the helicopter 10, the antenna being directed to the ground station 20 by the air-borne station 16. The direction of the antenna 12 is controlled automatically so that it is always directed to the ground station irrespective of the movement of the helicopter 10. When the helicopter 10 does not send the television video signal to the ground station, the antenna 12 is rotated upwardly to the rear of the helicopter as shown by 12-1. A VHF or UHF non-directive antenna 30 is also provided for the helicopter for receiving command signals from the ground station. The detail of the air-borne station and the repeating antenna will be described later.

The ground office 20 comprises a broadcasting office on the ground or a repeating office connected to the broadcasting office through a microwave channel. There is provided a parabola antenna 22 for receiving the television video signals. This receiving antenna is directed to the direction of movement of the helicopter 10. A tracking antenna 24 is formed integral with the receiving antenna 22 with a spacing not to create an interference between the two antennae. The tracking antenna 24 comprises a parabolic reflector and a metal cup eccentrically mounted on the front face of the reflector. The metal cup is rotated at a constant speed for conically scanning the receiving lobe. The tracking antenna 24 has a directive characteristic having a pull in angle of about ±7°. For this reason, the tracking antenna 24 can track an object at high stabilities. The receiving antenna 22 and the tracking antenna 24 are mounted on an antenna driving unit 25 and such antenna equipment is mounted on the building of the ground office or on a steel tower as is well known in the art. The ground station 28 is provided with means for controlling the tracking action of the tracking antenna 24 and means for sending to the helicopter 10 the azimuth angle and the elevation angle of the tracking antenna 24 as the positional informations. Of course it also comprises means for supplying the repeated signal received by the receiving antenna 22 to the television broadcasting station. The transmitting antenna 26 comprises a Yagi antenna secured to one end of the receiving antenna 22 and transmits said positional informations regarding the helicopter 10 produced by the ground station to the air-borne station.

The detail of the tracking antenna 24 and the ground station will be described hereinbelow. Typical data of the electric waves utilized in the repeating system shown in FIG. 1 are as follows. Electric waves in the SHF band for example from 6 to 7GH$_z$ or from 10 to 13GH$_z$ are used as the carrier wave for the television video signals, and the wave for transmitting the positional informations to the air-borne station is a wave in the VHF band having a carrier frequency of from 140 to 170MH$_z$ or a wave in the UHF band ranging 450 to 460MH$_z$ and the wave is transmitted by superposing it on the voice signal. The frequency of the wave is determined according to the wave regulation in a particular area.

Figure 1A:
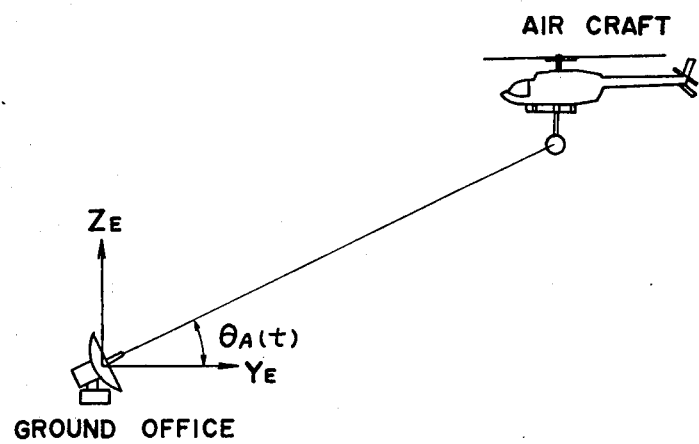
FIGS. 1a and 1b are diagrams showing the angle between the ground office and the helicopter on the globe coordinate in which the ground office is located at the origin.
Figure 1B:
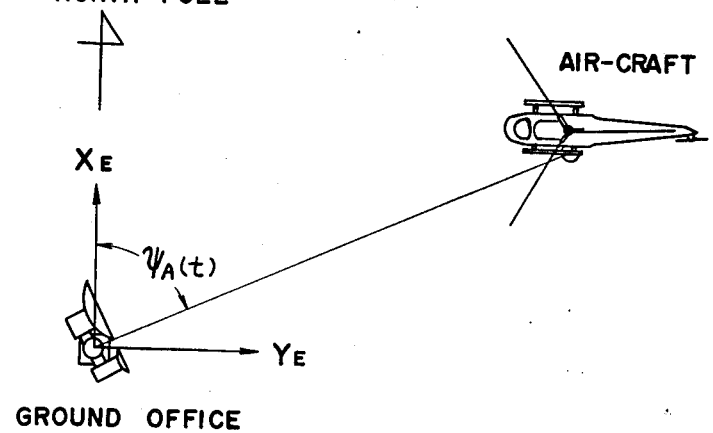

FIGS. 1a and 1b are diagrams showing the angle between the ground office and the helicopter on the globe coordinate in which the ground office is located at the origin. The $X_E$ axis of the globe coordinate is set in parallel with the ground surface and fixed toward the terrestrial North Pole. The $Y_E$ axis intersects the $X_E$ axis at right angles at the origin and extends in the east-west direction in parallel with the ground surface. The $Z_E$ axis is perpendicular to the plane $X_E$-$Y_E$ and represents the altitude.

FIG. 1a shows the positions of the ground surface and the helicopter on the $Y_E$-$Z_E$ plane. The inclination of a line interconnecting the ground office and the repeating antenna on the helicopter with respect to the axis $Y_E$ represents the elevation angle $\theta$ A(t) FIG. 1b shows the positions of the ground office and the helicopter on the $X_E$-$Y_E$ plane, and the inclination of a line interconnecting the ground office and the repeating antenna with respect to the $X_E$ axis represents the azimuth angle $\phi$ A(t). It will thus be readily understood that the direction of the directivity of the repeating antenna on the globe coordinate can be represented by two angles, namely the azimuth angle $\phi$ (t) and the elevation angle $\phi$ A(t).

Except a case wherein the helicopter flies horizontally, the azimuth angle $\phi$ A(t) and the elevation angle $\theta$ A(t) can not directly control the direction of the repeating antenna because the helicopter moves randomly and the repeating antenna moves with the helicopter. In other words, it is necessary to control the repeating antenna in accordance with the azimuth angle $\phi$ B(t) and the elevation angle $\theta$ B(t) given by the air-borne coordinate fixed to the helicopter.

Figure 2:
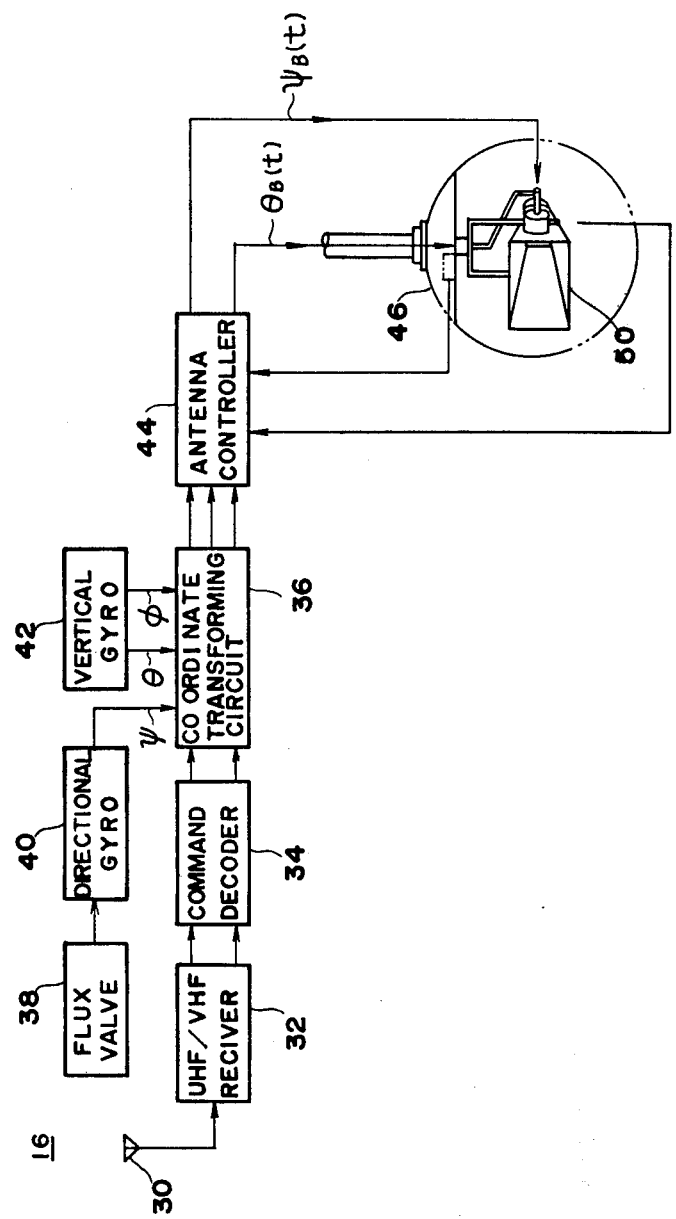
FIG. 2 is a functional block diagram showing one embodiment of the control system of this invention as applied to the air-borne station mounted on the helicopter shown in FIG. 1.

FIG. 2 is a functional block diagram showing one embodiment of the control system of this invention as applied to the air-borne station mounted on the helicopter shown in FIG. 1. The functions of respective blocks are accomplished by appropriate devices or circuits.

In FIG. 2, the air-borne station 16 is connected to apply to a UHF or VHF receiver 32 an angle command signal received by a receiving antenna 30 and containing an information representing the flight position of the helicopter. The receiver 32 is a well known UHF or VHF receiver and functions to reproduce the transmitted positional information which is given by two angle components. That is the elevation angle $\theta$A and the azimuth angle $\phi$A of the helicopter on the globe coordinate taking the ground office as the origin. Since the position of the helicopter varies from time to time angles $\theta$ A and $\phi$ A are generally represented as $\theta$ A(t) and $\phi$ A(t) which are functions of the time. As a consequence the receiver 32 is connected to a command decoder 34 so as to continuously apply the reproduced angle signals representing the elevation angle $\theta$ A(t) and the azimuth angle $\phi$ A(t).

The command decoder 34 operates to decode the angle command signal containing the elevation angle $\theta$ A(t) and the azimuth angle $\phi$ A(t) to produce signals representing these angles. The conversion made by the command decoder 34 is a digital-analogue conversion in which the command signal which has been subjected to a PCM-FSK conversion in the ground office as will be described hereinafter is connected reversely. The detail of the command decoder 34 will be described hereinafter.

A coordinate transforming circuit 36 is provided for processing the azimuth angle $\phi$ A(t) and the elevation angle $\theta$ A(t) given by the command decoder 34 to produce coordinate components $X_B$, $Y_B$ and $Z_B$ of the unit vector on the air-borne coordinate in which the repeating antenna is taken as the origin. The three axes rectangular coordinate is fixed to the helicopter such that the repeating antenna is positioned at the origin of the air-borne, that the $X_B$ axis is fixed in parallel with the fore and aft axis of the craft, that the $Y_B$ axis is fixed in parallel with the transverse direction of the craft and that the $Z_B$ axis is fixed in parallel with the axis of rotation of the main rotor of the helicopter. In this manner, since axes $X_B$, $Y_B$ and $Z_B$ are fixed to the helicopter the positions of the axes of the air-borne coordinate with respect to the globe coordinate are varied in accordance with the movement of the helicopter.

In order to transform the coordinate signals $X_E$, $Y_E$ and $Z_E$ into the air-borne coordinate signals $X_B$, $Y_B$ and $Z_B$ by the coordinate transforming circuit 36 the azimuth angle $\phi$ of the head of the helicopter on the globe coordinate, the pitch angle $\theta$ and the rolling angle $\phi$ of the craft are used.

As shown in FIG. 2, the azimuth angle $\phi$ is applied to the coordinate transforming circuit 36 from a flux valve 38 through a directional gyroscope 40 whereas the pitch angle $\theta$ and the rolling angle $\phi$ are applied to the coordinate transforming circuit 36 from a vertical gyroscope 42. The coordinate signals $X_B$, $Y_B$ and $Z_B$ whose coordinates have been transformed by the coordinate transforming circuit 36 are applied to an antenna controller 44.

Although not shown in the drawing, the antenna controller 44 is provided with two servo-loop systems which give the angles of rotations $\theta$ B(t) and $\phi$ B(t) of two driving shafts of the repeating antenna. The antenna controller 44 is housed in an antenna dome 46 together with the antenna driving unit except that an amplifier is included in the air-borne station 16. The repeating antenna contained in the antenna dome 46 takes the form of an angular space horn antenna usually used in the micro wave communication systems in the SHF band. Typical characteristics of the repeating antenna are as follows. Thus its half value angle is about 10° to 15° both in the vertical and horizontal directions and the antenna radiation gain is about 20dB at a transmission frequency of from 6 to 7GH$_z$.

The detail of the construction of the blocks shown in FIG. 2 except the UHF or VHF receiver and the command decoder 34 of the air-borne station is described in detail hereinafter.

Figure 3:
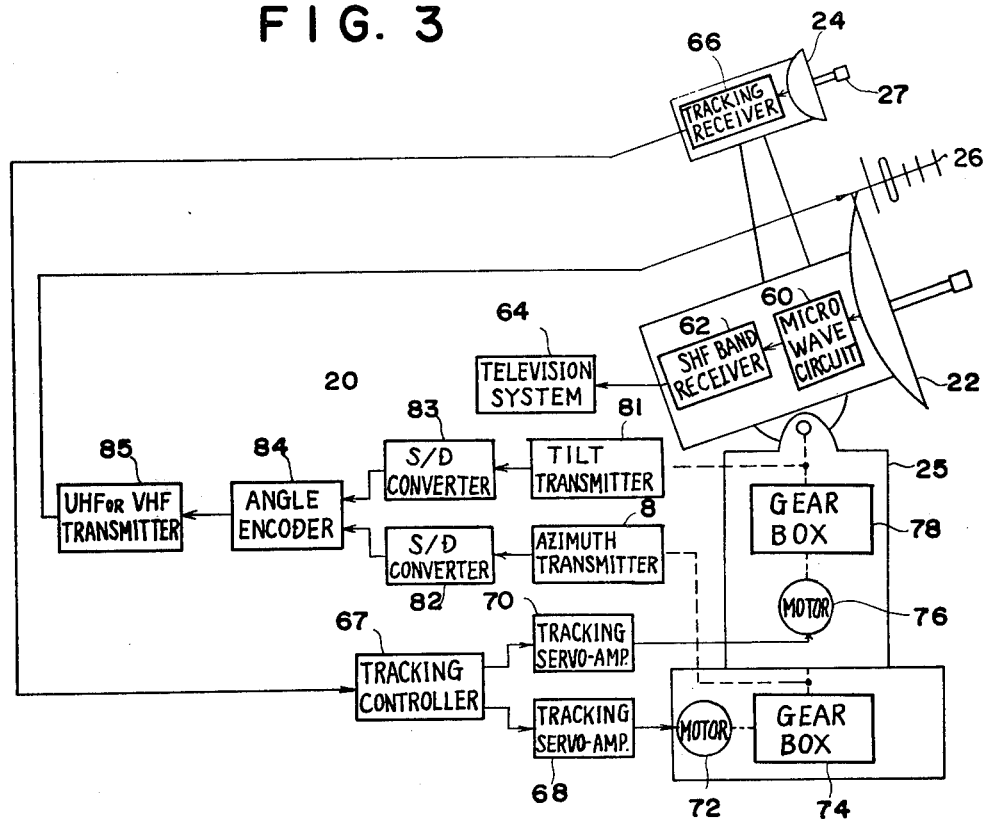
FIG. 3 is a functional block diagram showing one example of the ground office, particularly the ground station shown in FIG. 1.

FIG. 3 is a functional block diagram showing one example of the ground ofice, particularly the ground station shown in FIG. 1, the functions of respective blocks being provided by appropriate apparatus on circuits.

The television signal received by the receiving antenna 22 is coupled to a microwave circuit 60 which matches the receiving antenna with the transmitting antenna for reproducing the received television video signal by a SHF band receiver 62 and the output from this receiver is sent to a television system 64. The reception of the video signals can be made by the conventional equipment of a broadcasting station.

Figure 3A:
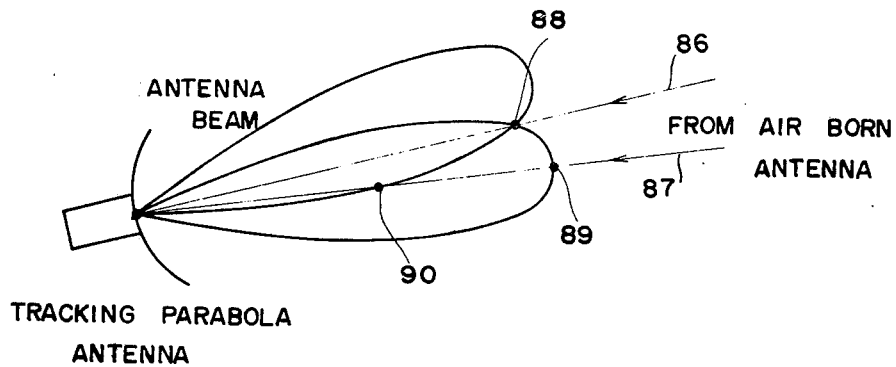
FIG. 3a shows one example of the antenna lobe of the tracking antenna.

The television video signal received by the tracking antenna 24 is used for tracking the helicopter. The construction and operation of the tracking antenna will now be described. More particularly, as above described, the tracking antenna 24 includes a metal cup 27 eccentrically joined in front of the parabolic reflecting surface and eccentrically rotated at a constant speed. FIG. 3a shows the antenna lobe of the tracking antenna 24. As shown in FIG. 3a the antenna lobe is scanned conically. When the wave comes from a direction coincident with the direction of directivity of the repeating antenna shown by arrow 86 the signal received by the antenna is maintained constant. When the wave comes in the direction indicated by arrow 87 which is shifted from the direction of directivity, the intensity of the signal received by the antenna varies between a maximum 89 and a minimum 90 as the antenna lobe is rotated. Thus, the incoming wave is subjected to an amplitude modulation in synchronism with the rotation of the metal cup and the signal obtained by the demodulation of this signal represents the error signal of the tracking antenna 24. Accordingly, when the direction of the tracking antenna is controlled so that the error signal is the minimum the tracking antenna 24 will precisely track the movement of the helicopter.

Referring again to FIG. 3 the tracking antenna 24 is coupled to a tracking receiver 66 which acts to demodulate the television signal that has been amplitude modulated by the above described conical scanning reception for producing the error signal which is applied to a tracking controller 67. The tracking controller 67 functions to divide the applied error signal into two components in the elevation angle and the azimuth angle respectively of the tracking antenna, thereby giving an elevation angle deviation and an azimuth angle deviation necessary for tracking. The dividing means utilized in the tracking controller 67 may comprise a phase discriminator that divide the error signal into two signals having a phase difference of 90°. The azimuth angle deviation signal from the tracking controller 67 is amplified by a tracking servo-amplifier 68 for driving an azimuth motor 72. The azimuth motor 72 rotates the vertical shaft of the antenna drive unit 25 through a gear box 74 for coinciding the tracking antenna 24 with the azimuth angle $\phi$ A(t) in which the helicopter is oriented.

The elevation angle deviation signal from the tracking controller 67 is amplified by a tracking servo-amplifier 70 to drive a tilting motor 76 which rotates the horizontal shaft of the antenna drive unit 25 for coinciding the tracking antenna 24 with the elevation angle $\theta$ A(t) in which the helicopter is directed.

As shown by dotted lines, the vertical shaft of the antenna driving unit 25 is connected to an azimuth synchro transmitter 80 whereas the horizontal shaft to a tilt synchro transmitter 81. Accordingly, the azimuth synchro transmitter 80 and the tilt synchro transmitter 81 produce respectively signals representing the azimuth angle $\phi$ A(t) and the elevation angle 74 A(t) of the traking antenna. The signal representing the azimuth angle $\phi$ A(t) is applied to a S/D converter 82 for connecting the synchro signal representing the angle into a binary encoded digital signal. In the same manner, the synchro signal representing the elevation angle $\theta$ A(t) is converted into a binary encoded digital signal by a S/D converter 83. The digital signals produced by S/D converters 82 and 83 and representing angles are supplied to an angle encoder 84 which subject the digital signals applied in parallel thereto to a PCM-FSK modulation. The angle encoder 84 is constituted by a PCM (pulse code modulation)-FSK (frequency shift keying) modulator. The angle information subjected to the PCM-FSK modulation is supplied to a UHF or VHF transmitter 85 to be subjected to a frequency modulation and then amplified. The FM modulated signal is transmitted to the helicopter through the transmitting antenna 26. The UHF or VHF transmitter 85 may be a conventional transmitter utilized for communicating with aircrafts. Where the voice signal is also transmitted from the ground office the voice signal is multiplexed with the PCM-FSK modulated angle signal from the angle encoder 84.

As above described, respective blocks of the ground ofice equipment shown in FIG. 3 are constituted by well known apparatus or circuits, the overall function including a number of novel features devised for the purpose of providing a novel direction control system of this invention.

Figure 4A:
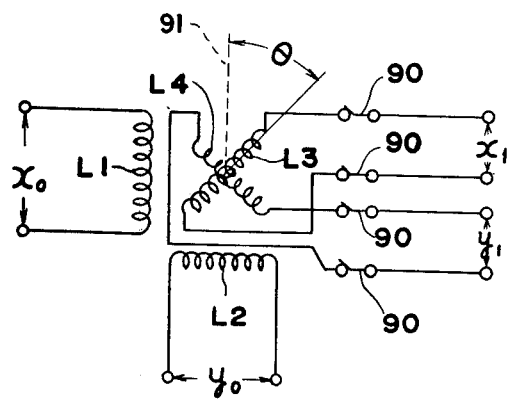
FIG. 4a is a circuit diagram showing windings of a resolver employed in the coordinate transforming circuit in FIG. 4
Figure 4B:
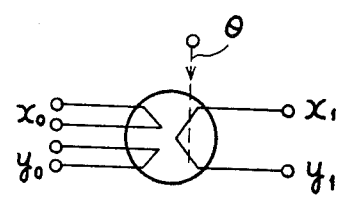
FIG. 4b is a diagram showing circuit symbols of the resolver.
Figure 5:
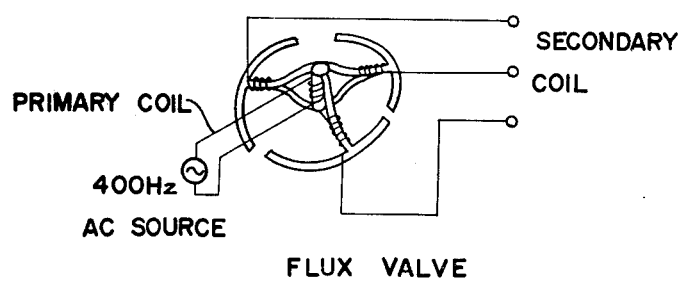
FIG. 5 is a diagrammatic representation of one example of the flux valve shown in FIG. 2.
Figure 6:
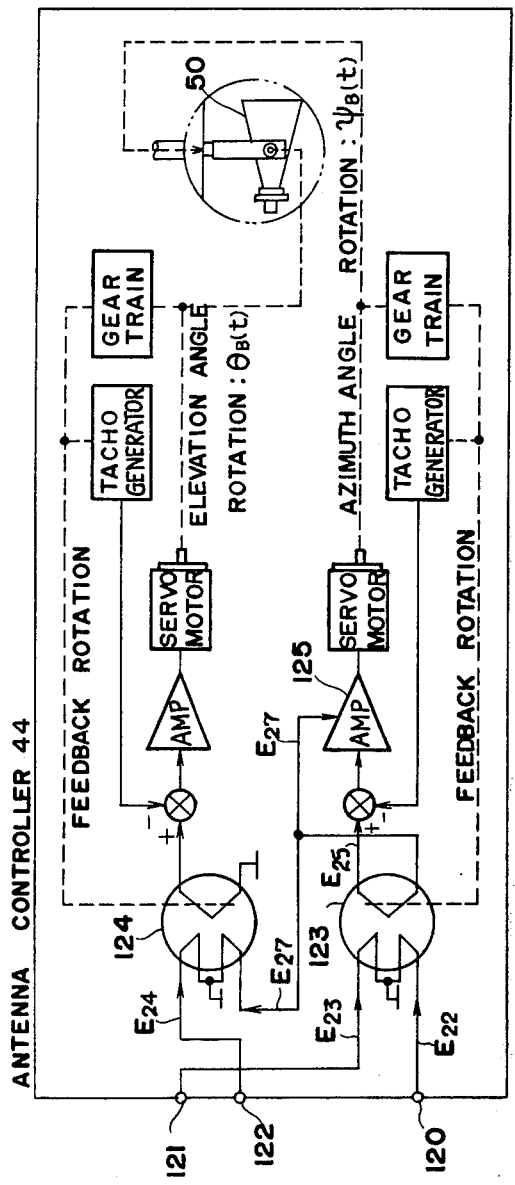
FIG. 6 is a block diagram showing one example of the antenna controller shown in FIG. 2.

Examples of respective blocks shown in FIG. 2 except the receiver 32 and the command decoder 34 are shown in FIGS. 4, 5 and 6. The command decoder 34 functions to decode the PCM-FSK modulated angle signal that has been demodulated by receiver 32 and comprises a combination of a well known decoder and a D/S converter for producing the synchro signals representing the azimuth angle $\phi$ A($t$) and the elevation angle $\theta$ B($t$) of the tracking antenna shown in FIG. 3.

FIG. 4 shows a connection diagram of the coordinate transforming circuit 36 shown in FIG. 2. The coordinate transforming circuit 36 comprises resolvers 100, 102, 103, 104 and 105. One of them shown in FIG. 4a comprises a stationary windings $L_1$ and $L_2$ disposed at right angles with each other and rotary windings $L_3$ and $L_4$ also at right angles and arranged to rotate inside of the stationary windings. The rotary windings $L_3$ and $L_4$ are mounted on a mechanical shaft 91 shown by a dotted line at an angle of $\theta$. The rotary windings are provided with brushes 90 for deriving out their outputs. When signals $x_O$ and $y_O$ are applied to the stationary windings $L_1$ and $L_2$, respectively, the signals $x_1$ and $y_1$ produced in the rotary windings respectively at an angle of rotation $\theta$ are expressed by the following equation $$\begin{bmatrix} x_1 \\ y_1 \end{bmatrix} = \begin{bmatrix} \cos\theta & \sin\theta \\ -\sin\theta & \cos\theta \end{bmatrix} \begin{bmatrix} x_0 \\ y_0 \end{bmatrix}$$

FIG. 4a shows the circuit symbols of a resolver.

The coordinate transforming constituted by a plurality of resolvers as shown in FIG. 4 operates to produce the coordinates ($X_E$ $Y_E$ and $Z_E$) of the unit vector in the direction toward the ground office from the origin of the globe coordinate taking the repeating antenna as the origin from the azimuth angle $\phi$ A($t$) and the elevation angle $\theta$ A($t$) given as the angle command signals.

Such coordinate transformation is given by the following equation $$\begin{bmatrix} x_E \\ y_E \\ z_E \end{bmatrix} = \begin{bmatrix} \cos\theta\, A(t) \cdot \cos\phi\, A(t) \\ \cos\theta\, A(t) \cdot \sin\phi\, A(t) \\ -\sin\theta\, A(t) \end{bmatrix} \quad (2)$$

The the coordinate transforming circuit transforms the coordinate ($x_E$, $y_E$, $z_E$) obtained by equation (2) into the air-borne coordinate utilizing the repeating antenna as the origin by using the azimuth angle $\phi$, pitch angle $\theta$ and the rolling angle $\phi$ of the craft. The equation of this coordinate transformation is given by $$\begin{bmatrix} x_B \\ y_B \\ z_B \end{bmatrix} = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta \end{bmatrix} \quad (3)$$

$$\begin{bmatrix} \cos\phi & \sin\phi & 0 \\ -\sin\phi & \cos\phi & 0 \\ 0 & 0 & 1 \end{bmatrix} \begin{bmatrix} x_E \\ y_E \\ z_E \end{bmatrix}$$

In this manner, the coordinate transforming circuit shown in FIG. 4 produces outputs, that is the air-borne coordinate components ($x_B$, $y_B$, $z_B$) wherein the repeating antenna is taken as the origin.

The transforming computation of equation (2) is performed by resolvers 100 and 102 shown in FIG. 4. A signal $E_{10}$ representing the elevation angle $\theta$ A($t$) is applied to an input terminal 92 connected to the resolver driving unit 95. The resolver driving unit 95 is constituted by a well known servo-circuit including a conventional servo-motor for rotating the shaft of the resolver 100 indicated by dotted lines by a angle $\theta$ A($t$) in accordance with signal $E_{10}$. A reference voltage source 96 is provided for impressing upon one of the stationary windings of the resolver 100 a voltage signal $E_{12}$ representing the magnitude of the unit vector. It is assumed herein that $E_{12}=1$. The output from the rotary windings of the resolver 100 are expressed by $E_{13}=\cos\theta$ QA($t$) and $E_{14}=-\sin\theta$ A($t$) as can be noted from equation (1). Signal $E_{13}$ is applied to one of the stationary windings of the resolver 102.

A signal $E_{11}$ representing the azimuth angle $\phi$ A($t$) signal is applied to input terminal 94 which is connected to a resolver drive unit 97 comprising a well known servo-circuit. The resolver drive unit 97 rotates the driving shaft of the resolver 102 by an angle $\phi$ A($t$). Accordingly, one of the rotary windings of the resolver 102 is impressed with a signal $E_{15}=\cos\theta$ A($t$).sin $\phi$ A($t$) whereas the other winding with a signal $E_{16}=\cos\theta$ A($t$). cos $\phi$ A($t$). Thus, $$\begin{bmatrix} E_{16} \\ E_{15} \\ E_{14} \end{bmatrix} = \begin{bmatrix} x_E \\ y_E \\ z_E \end{bmatrix} = \begin{bmatrix} \cos\theta\, A(t) \cdot \cos\phi\, A(t) \\ \cos\theta\, A(t) \cdot \sin\phi\, A(t) \\ -\sin\theta\, A(t) \end{bmatrix} \quad (4)$$

indicating that the coordinate transformation expressed by equation (2) is effected.

Resolvers 103, 104 and 105 perform the coordinate transformation expressed by equation (3). One of the stationary windings of the resolver 103 is supplied with a signal $E_{16}$ while the other stationary winding a signal $E_{15}$. A signal $E_{17}$ representing the azimuth angle $\phi$ of the helicopter is applied to an input terminal 108 which is connected to a resolver driving unit. As shown by dotted lines, the resolver driving unit 108 rotates the rotary winding of resolver 103 by angle $\phi$ for producing signals $E_{18}$ and $E_{20}$ from the rotary windings. The resolver 103 effects the following coordinate transformation expressed by equation (3).

$$\begin{bmatrix} \cos\phi & \sin\phi & 0 \\ -\sin\phi & \cos\phi & 0 \\ 0 & 0 & 1 \end{bmatrix} \begin{bmatrix} E_{16} \\ E_{15} \\ E_{14} \end{bmatrix}$$

One of the stationary windings of resolver 104 is connected to receive signal $E_{14}$ from the resolver 100, whereas the other stationary winding is supplied with signal $E_{18}$ from the resolver 103.

Input terminal 110 is supplied with a signal $E_{19}$ representing the pitch angle $\theta$ of the helicopter. A resolver drive unit 111 rotates the shaft of resolver 104 by angle $\theta$ for producing signals $E_{21}$ and $E_{22}$ by the rotary windings. The resolver 104 performs the coordinate transformation:

$$\begin{bmatrix} \cos\theta & 0 & -\sin\theta \\ 0 & 1 & 0 \\ \sin\theta & 0 & \cos\theta \end{bmatrix} \begin{bmatrix} E_{18} \\ E_{19} \\ E_{14} \end{bmatrix}$$

of equation (3).

One of the stationary windings of resolver 105 is supplied with signal $E_{20}$ from the resolver 103 while the other stationary winding is supplied with the signal $E_{21}$ from resolver 104. A signal $E_{25}$ representing the rolling angle $\phi$ of the helicopter is applied to an input terminal 112. A resolver drive unit 113 rotates the rotary shaft of the resolver 105 by angle $\phi$ for producing output signals $E_{23}$ and $E_{24}$ by its rotary windings. The two output conductors of the rotary windings of the resolver 105 are connected to output terminals 115 and 116 through a transfer switch 107. The coordinate transformation effected by resolver 105 gives the solution of equations $$\begin{bmatrix} E_{22} \\ E_{23} \\ E_{24} \end{bmatrix} = \begin{bmatrix} x_B \\ y_B \\ z_B \end{bmatrix} = \begin{bmatrix} 1 & 0 & 0 \\ 0 & \cos\phi & \sin\phi \\ 0 & -\sin\phi & \cos\phi \end{bmatrix}$$

thereby producing $x_B$ signal $E_{22}$, $y_B$ signal $E_{23}$ and $z_B$ signal $E_{24}$.

The transfer switch 107 interchanges signals $E_{23}$ and $E_{24}$ applied to the output terminals 115 and 116 and is effective to remove the dead point locking of the repeating antenna as will be described later. A switch drive unit 106 comprises a well known relay circuit including transistors and is controlled by the ON–OFF operations of a limit switch provided at a position at which the dead point locking of the repeating antenna occurs.

FIG. 5 is a diagrammatic representation of one example of the flux valve 38 shown in FIG. 2. The flux valve 38 is mounted on the helicopter for detecting direction of the flux of the terrestrial magnetism for producing an electric signal applied to a directional gyroscope. More particularly, it comprises a Y shaped magnetic core, and a primary winding mounted on the center leg of the core and energized by an exciting current having a frequency of 400Hz, and three secondary windings mounted on respective arms of the Y shaped core for inducing voltages having a frequency of 800Hz under the influence of the terrestrial magnetism. The relationship between the secondary voltages determines the direction of the terrestrial magnetic flux as is well understood by one skilled in the art.

The directional gyroscope 40 shown in FIG. 2 is a well known device usually mounted on the aircraft and is coupled to the flux valve 38 described above for applying the azimuth angle $\phi$ of the head of the helicopter to the coordinate transforming circuit.

Also the vertical gyroscope 42 shown in FIG. 2 is well known in the art and by incorporating a synchrotransmitter into this gyroscope it becomes possible to derive out electric signals representing the pitch angle $\theta$ and the rolling angle $\phi$ of the helicopter.

FIG. 6 is a block diagram showing one example of the antenna controller 44 shown in FIG. 2. The antenna controller 44 is contained in a dome together with the repeating antenna except its amplifier.

The antenna controller 44 converts the unit vector on the air-borne (coordinates utilizing the repeating antenna as the origin) $x_B$, $y_B$ and $z_B$ obtained by the coordinate transforming circuit 36 shown in FIG. 4 into two angle components corresponding to the azimuth angle $\phi_B(t)$ and the elevation angle $\theta_B(t)$ respectively thereby rotating the two shafts of the repeating antenna by angles $\phi_B(t)$ and $\theta_B(t)$ respectively. The coordinate transformation effected by the antenna controller 44 is given by an equation $$\begin{bmatrix} x_B \\ y_B \\ z_B \end{bmatrix} = \begin{bmatrix} \cos\theta_B(t) \cdot \cos\phi_B(t) \\ \cos\theta_B(t) \cdot \sin\phi_B(t) \\ -\sin\theta_B(t) \end{bmatrix} \quad (5)$$

The circuit for producing the azimuth angle $\phi_B(t)$ and the elevation angle $\theta_B(t)$ in accordance with equation 5 can be constituted by resolvers 123 and 124. For this reason, it can be considered that the antenna controller 44 includes a portion of the coordinate transforming circuit.

As shown in FIG. 6, an input terminal 120 is connected to one of the stationary windings of the resolver 123 and supplied with the $x_B$ signal $E_{22}$ on the air-borne coordinate. Further, an input terminal 121 is connected to the other stationary winding and supplied with the $y_B$ signal $E_{23}$ on the air-borne coordinate. One of the rotary windings of the resolver 123 supplies a signal $E_{26}$ to a servo-amplifier 125 for driving a servo-loop including a servo-motor, a tachometer generator and gear train thereby transmitting a rotation corresponding to the azimuth angle $\phi_B(t)$ to the repeating antenna 50. This azimuth angle rotation is transmitted to the shaft of resolver 123 by a feedback loop shown by dotted lines. The servo-loop including the resolver 123 transmits to the repeating antenna the rotation of the azimuth angle $\phi_B(t)$ of the unit vector on the air-borne coordinate ($x_B$, $y_B$) utilizing the repeating antenna 50 as the origin and give by signals $E_{22}$ and $E_{23}$.

The resolver 124 gives the downward elevation angle $\theta_B(t)$ of the repeating antenna on the air-borne coordinate. One of the stationary windings of the resolver 124 is supplied with the $z_B$ signal $E_{24}$ on the air-borne coordinate from input terminal 122 whereas the other stationary winding is supplied from output of the resolver 123 with signal $E_{27}$ representing the projection on the $X_B$-$Y_B$ plane of a unit vector representing $\cos\theta_B(t)$ that is the direction of the repeating antenna on the air-borne coordinate. One of the rotary windings of the resolver 124 applies an elevation angle signal to a servo-loop including a servo-amplifier, a servo-motor, a tachometer generator and a gear train. The servo-loop transmits a rotation corresponding to the elevation angle $\theta_B(t)$ to the repeating antenna 50 as shown by dotted lines. As shown by dotted lines the elevation angle rotation from the gear train is transmitted to the shaft of the resolver 124 through a feedback loop.

The servo-amplifier 125 shown in FIG. 6 is supplied with signal $E_{27}$ from the resolver 123. As described above signal $E_{27}$ has a magnitude of $\cos \theta_B(t)$. The input terminal of the amplifier 125 which is connected to receive the signal $E_{27}$ acts as the gain adjusting terminal of the amplifier. Thus, signal $E_{26}$ functions to adjust the gain of the servo-amplifier 125. In other words, the amplifier 125 automatically controls its gain in proportion to $1/-\cos \theta_B(t)$ for the input signal $E_{26}$. Accordingly, the servo-loop for the azimuth angle $\phi_B(t)$ maintains a constant loop gain irrespective to the value of the elevation angle $\phi_B(t)$ of the repeating antenna 50, thereby improving the accuracy of the follow-up without impeding the stability. Turning back to FIG. 4, there is shown a transfer switch 107 that eliminates the dead point locking. The term "dead point locking" is used herein to mean a condition in which the control of the elevation angle of the repeating antenna becomes impossible at an elevation angle of the repeating antena $\theta_B(t) = 9°$. Thus, in equation (5), when $\theta_B(t) = 90°$, $$\begin{bmatrix} x_B \\ y_B \\ z_B \end{bmatrix} = \begin{bmatrix} 0 \\ 0 \\ 1 \end{bmatrix}$$

meaning that the control of the repeating antenna is impossible. At this time, the transfer switch 107 is operated to apply signals $E_{24}$ and $E_{23}$ to the output terminals 115 and 116, respectively. Under these conditions the two angle components provided by the antenna controller 44 are given by two angle components of the rolling angle $\phi_B(t)$ and the elevation angle $\rho_B(t)$ of the unit vector on the air-borne coordinate $(X_B, Y_B, z_B)$ having the repeating antenna at the origin. This relationship is expressed by an equation $$\begin{bmatrix} x_B \\ y_B \\ z_B \end{bmatrix} = \begin{bmatrix} \cos \rho_B(t) \cdot \sin \phi_B(t) \\ -\sin \rho_B(t) \\ \cos \rho_B(t) \cdot \cos \phi_B(t) \end{bmatrix} \quad (6)$$

Thus, it is possible to eliminate the dead point locking which occurs at $\theta_B(t) = 90°$. Conversely, when a dead point locking occurs corresponding to $\rho_B(t) = 90°$ in equation (6) the transfer switch 107 is thrown back to the state shown in FIG. 4 for eliminating this dead point locking. The switching of the transfer switch 107 between equations (5) and (6) is effected by setting the operating point of the transfer switch at a point close to the dead point by traveling a limit switch or a meter relay energized by a signal representing the angle of rotation of the repeating antenna.

Figure 7:
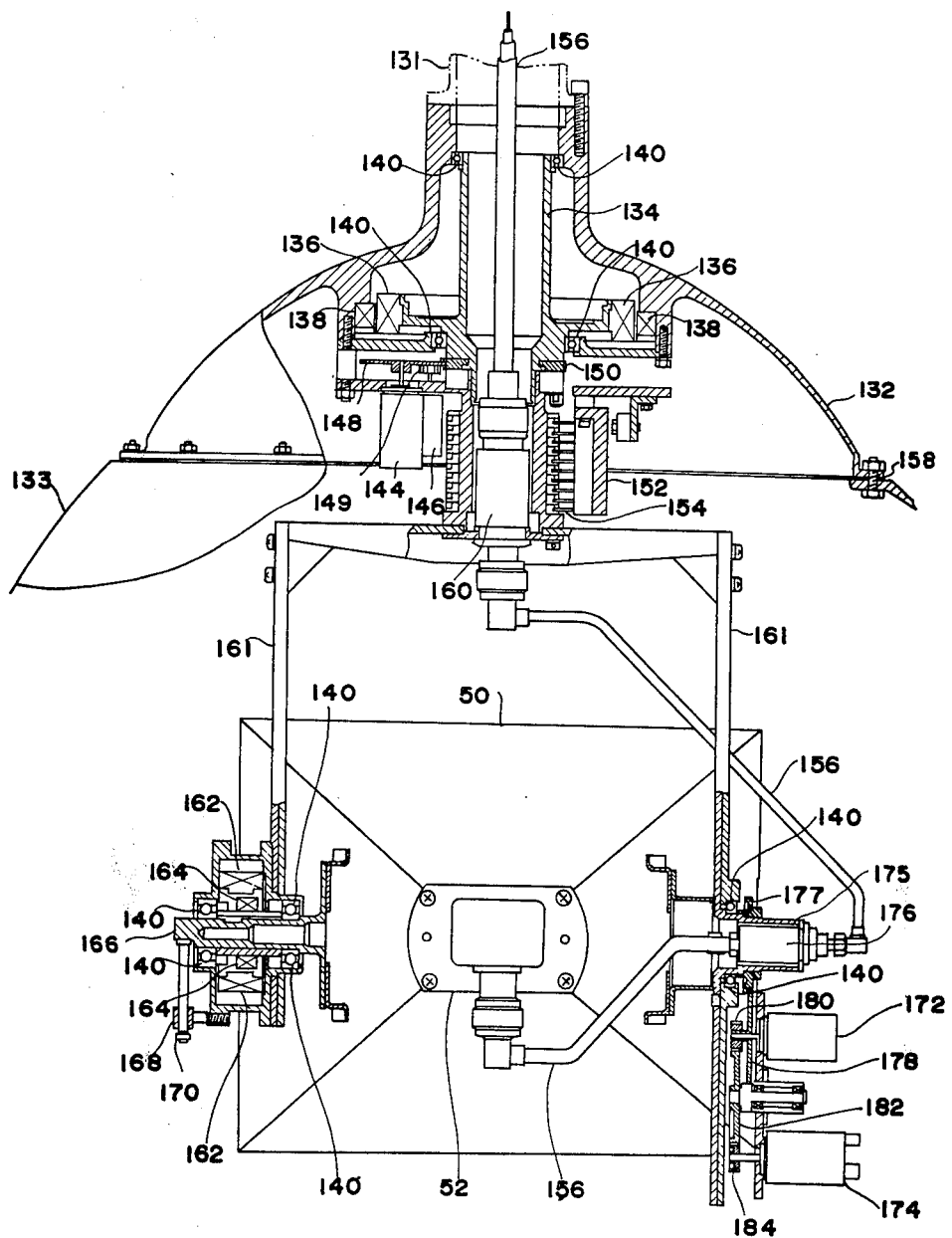
FIG. 7 is an elevational view, partly in section, showing the antenna controller and the antenna driving unit.

FIG. 7 is a side view, partly in section, showing the antenna controller except its amplifier and the antenna driving unit which are contained in the antenna dome.

As shown, a cover 132 is connected by screws to the lower portion of an antenna rod 131 suspended from the lower portion of the helicopter. A spherical radome 133 is secured by screws to the lower end of the cover 132 with a packing 158 interposed therebetween. Inside of the cover 132 is housed an azimuth angle driving unit including a servo-motor, a resolver and a gear train and acting to transmit the rotation corresponding to the azimuth angle $\phi_B(t)$ to the repeating antenna. The azimuth angle $\phi$ servo-motor comprises a rotary shaft 134 rotatally mounted on the cover 132 through a ball bearing 140, a rotary winding 136 mounted on the shaft 134, and a field winding. 138 secured to the cover 132 to surround the rotary winding. 10 Sets of slip rings are secured to the lower end of the shaft 134 to cooperate with brushes 154 mounted on a terminal board 152 secured to the interior of the cover 132. The central portion of the shaft 134 is provided with an integral gear 150 meshing a gear 148. A tachometer generator 144 connected to the gear 148 and an azimuth angle resolver 146 are secured to the inside of cover 132. Accordingly, the rotation of shaft 134 is transmitted to gear 148 through gear 150 for rotating the gear 149 of the azimuth angle resolver 146. As has been described in connection with FIG. 6, this azimuth angle driving unit constitutes an azimuth angle servo-loop including the resolver 123.

Referring again to FIG. 7, inside of the randome 133, a gimbal 161 is secured to the lower end of shaft 134 by a screw for supporting an elevation angle adjusting unit. An elevation angle servo-motor is secured to the lefthand side of the gimbal. The servo motor comprises a field winding 162, a rotatable shaft 166 supported by the repeating antenna 50 through a ball bearing 140, and a rotor winding 164 secured to the shaft 166. A stop arm 170 is secured to the outer end of shaft 166 to cooperate with a stop 168 secured to the gimbal 161 for limiting the rotation of the shaft 166.

An elevation angle resolver 172 and a tachometer generator 174 are secured to the righthand side of the gimbal 161. A shaft 175 secured to the repeating antenna 50 is rotatably mounted on the gimbal 161 through a ball bearing 140. To the shaft 175 is secured a gear 177 that meshes a gear 178 secured to the shaft of the elevation angle resolver 172. The gear 178 is formed integral with a gear 180 that meshes a gear 182 which in turn meshes a gear 184 secured to the shaft or the tachometer generator 174. Thus, the rotation of the repeating antenna causes by the elevation angle servo-motor is transmitted to the tachometer generator 174 and the elevation angle resolver 172 by various gears described above. The elevation angle driving unit described above constitutes the elevation angle servo-loop including the resolver 124 pointed out hereinabove in connection with FIG. 6.

A coaxial angle 156 for transmitting the televison video signals to the repeating antenna 50 from a television camera mounted on th helicopter extends through shaft 134 contained in the cover 132, through an azimuth rotary joint 160 secured to the lower end of the shaft 134 and through an elevation rotary joint 176 mounted on the right-hand side of the repeating antenna 50 to reach a coaxial adaptor 52 of the repeating antenna.

Figure 8:
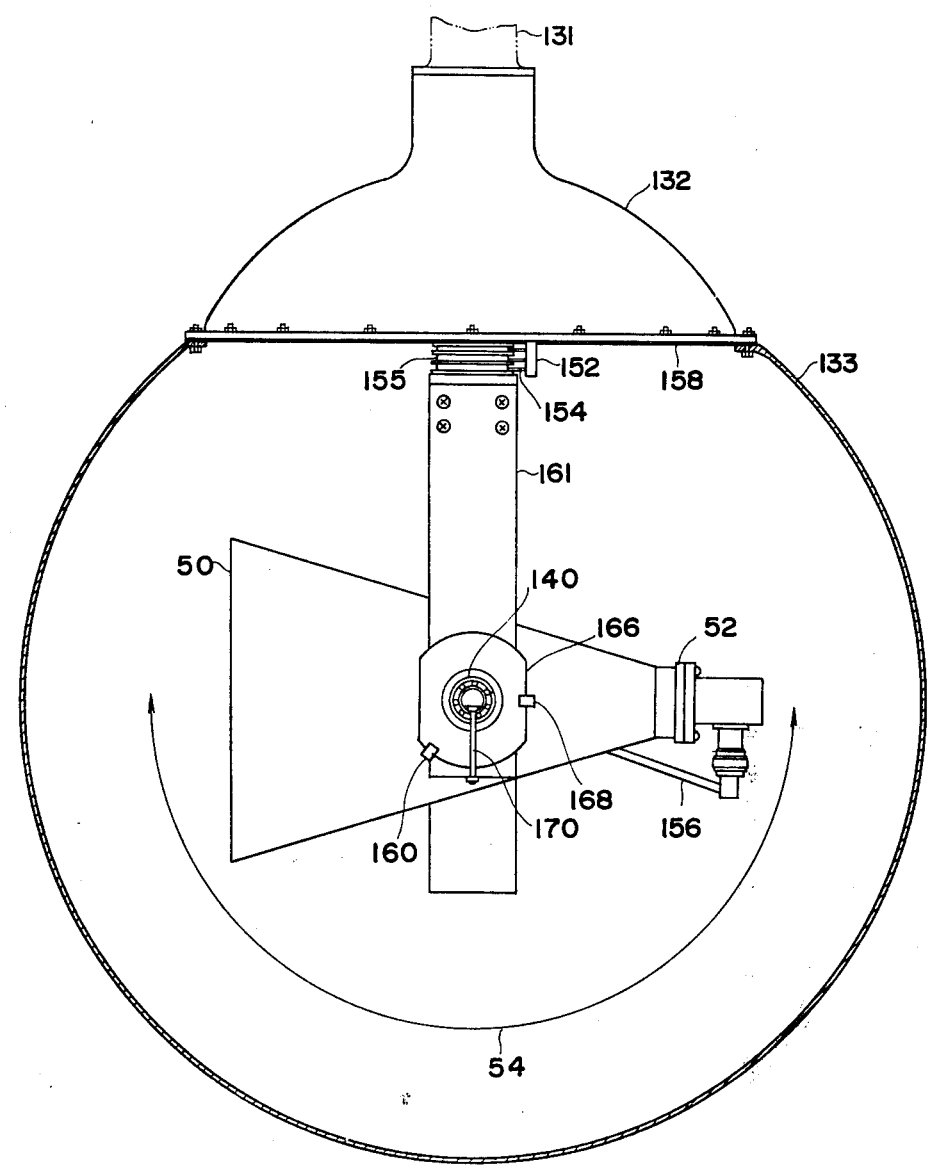
FIG. 8 is a side view of the assembly shown in FIG. 7.

FIG. 8 shows more clearly the manner of mounting the repeating antenna in which the same parts as in FIG. 7 are designated by the same reference numerals. As shown, the rotation of the repeating antenna 50 for adjusting its elevation angle can be continued until the rotation in the direction of arrow 54 is stopped by a stop.

Figure 9:
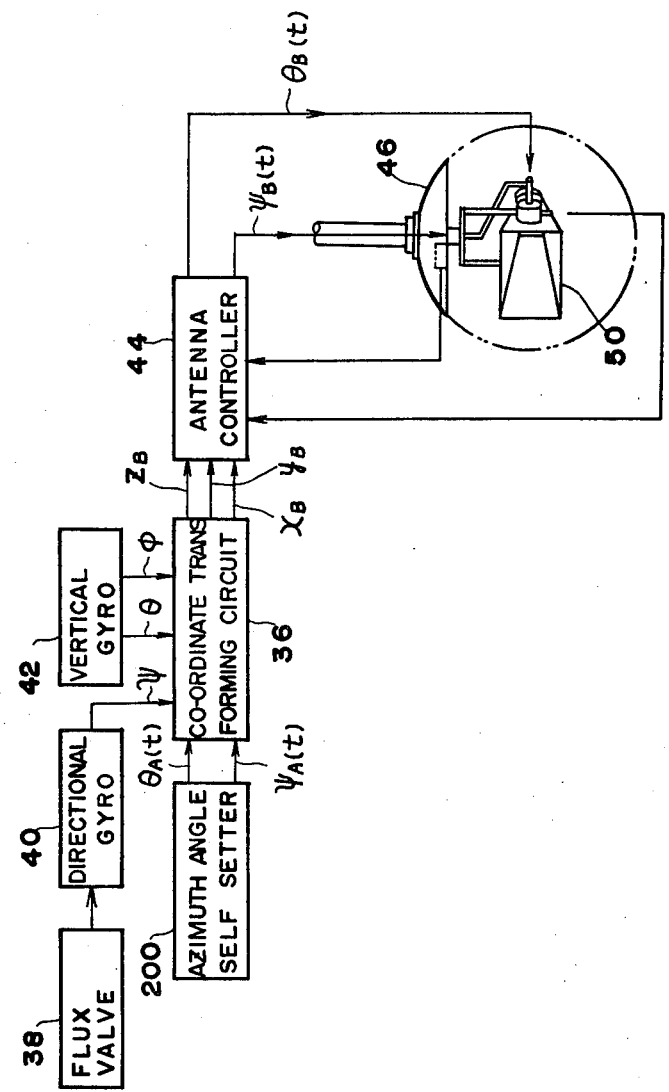
FIG. 9 is a block diagram showing another example of the automatic direction control system of a repeating antenna embodying the invention.

FIG. 9 is a functional block diagram showing another example of the automatic direction control system of the repeating antenna provided for an air-borne station. In this example, the aircraft can by itself set the azimuth angle without relaying upon an angle command signal sent from the ground office. The block diagram shown in FIG. 9 is similar to that shown in FIG. 2 except that the receiving antenna 30, the UHF or VHF receiver 32 and the command decoder 34 are substituted by an azimuth angle self setter 200.

Figure 10:
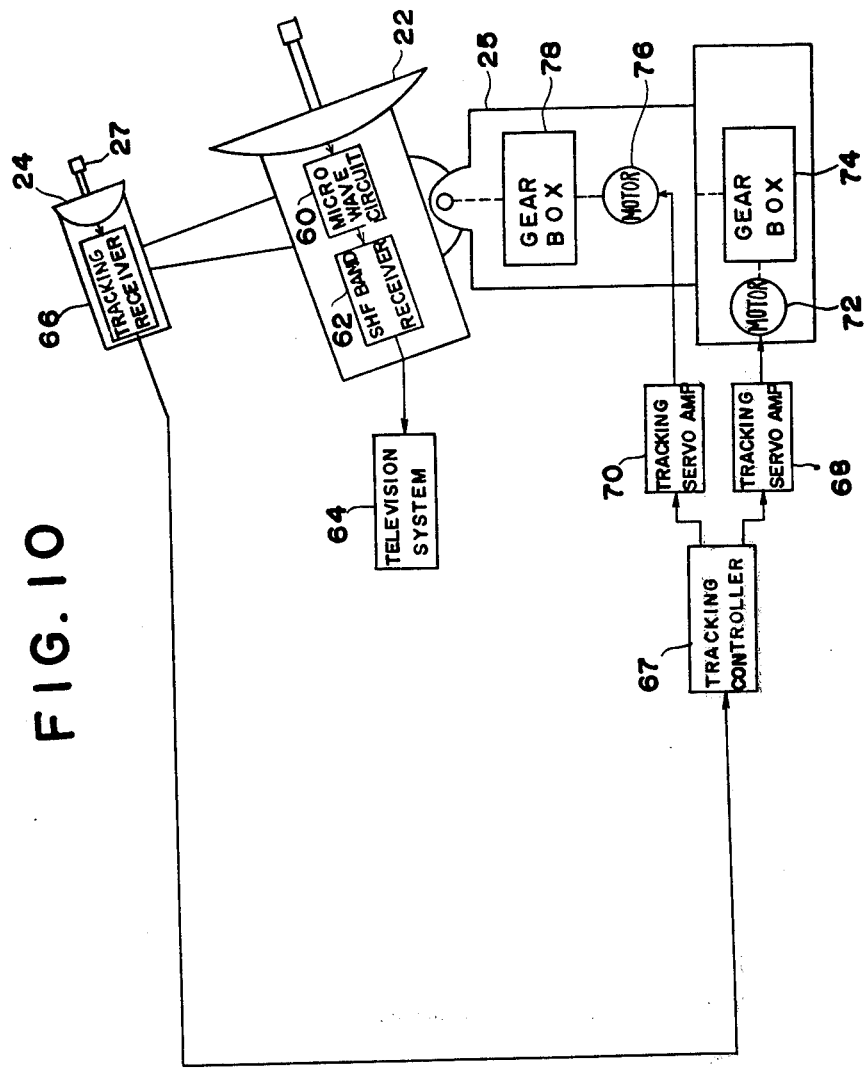
FIG. 10 is a block diagram showing a ground station constructed to cooperate with the air-borne station shown in FIG. 9.

FIG. 10 shows a functional block diagram of the ground station of the ground office which is constructed to cooperate with the air-borne station shown in FIG. 9. This ground station is simpler than that shown in FIG. 3, because it is not required to provide a command angle communication system which detects the azimuth angle $\phi_A(t)$ and the elevation angle $\theta_A(t)$ that indicate the position of the aircraft and send these informations to the craft.

Referring again to FIG. 9 the azimuth angle self setter 200 computes the azimuth angle $\phi_A(t)$ and the elevation angle $\theta_A(t)$ on the globe coordinate that indicate the direction of the repeating antenna in the following manner. Let us consider a globe coordinate utilizing the ground office as the origin, and by denoting the positional coordinate $P_t$ of the helicopter on this glove coordinate by $(x_t, y_t, -z_t)$, the azimuth angle $\phi_A(t)$ and the elevation angle $\theta_A(t)$ can be obtained by the following equations.

$$\phi_A(t) = \tan^{-1} \frac{y_t}{x_t} \tag{7}$$

$$\theta_A(t) = \tan^{-1} \frac{-z_t}{\sqrt{x_t^2 + y_t^2}}$$

The values of $x_t$ and $y_t$ required to solve these equations can be determined by the velocity of the helicopter with respect to the earth $V(t)$ and the angle of flight course with respect to the earth $\phi_E(t)$. The terms $z_t$ can be readily determined by the altitude of the helicopter.

Suppose now that the position of the helicopter relative to the ground office is at a predetermined initial point $P_O(x_O, y_O, -z_O)$, and that the helicopter flies from this initial point $P_O$ for an interval $t_1$ how at the velocity of $V(t)$ in the direction of $\phi_E(t)$ to reach a second point $P_1(x_1, y_1, -z_1)$. The values of $x_1$ and $y_1$ at the second point $P_1$ are given by the following equations.

$$X_1 = X_0 + \int_O^{t_1} V(t) \cos \phi_E(t) dt \tag{8}$$

$$y_1 = y_0 = + \int_O^{t_1} V(t) \sin \phi_E(t) dt$$

Then suppose that the helicopter flies from the second point $P_1$ to a third point $P_2(x_2, y_2, -z_2)$ for an interval $t_2 - t_1$ under the same condition. The values of $x_2$ and $y_2$ can be determined by the following equations.

$$x_2 = x_1 + \int_{t_1}^{t_2} V(t) \cos \phi_E(t) dt = x_0 + \tag{9}$$

$$\int_O^{t_2} V(t) \cos \phi_E(t) dt$$

$$y_2 = y_1 + \int_{t_1}^{t_2} V(T) \sin \phi_E(t) dt = y_0 + $$

$$\int_O^{t_2} V(t) \sin \phi_E(t) dt$$

Thus, the values of $x_t$ and $y_t$ when the helicopter flies from the initial point $P_O$ to any point $P_t(x_t, x_t, -z_t)$ can be determined by the following general equations.

$$x_t = x_0 + \int_O^t V(t) \cos \phi_E(t) dt \tag{10}$$

$$y_t = y_0 + \int_O^t V(t) \sin \phi_E(t) dt$$

Figure 11:
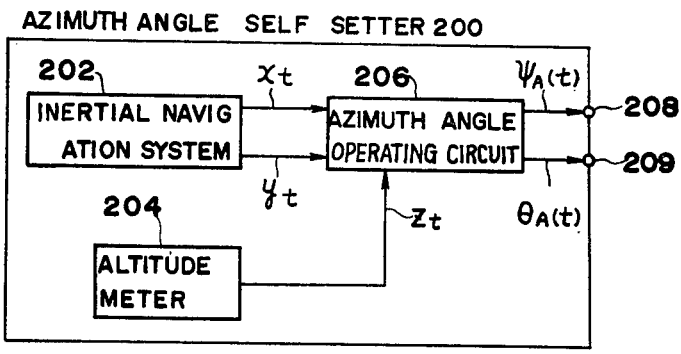
FIG. 11 is a block diagram showing the azimuth angle self setter showin in FIG. 9 that utilizes an inertial navigation system.

To calculate equations (10) it is advantageous to use an inertial navigation system FIG. 11 shows the azimuth angle self setter shown in FIG. 9 that utilizes an inertial navigation system. The inertial navigation system 202 is constructed to produce signals representing the values of $x_t$ and $y_t$ of the position coordinate $P_t(x_t, y_t, -z_t)$ of the helicopter. The LTN51 Inertial Navigation System according to FAA Advisory Circular No. 25-4 dated Feb. 18, 1966 and manufactured by Litton Industries, Guidance and Control Systems Division is preferable.

As the altitude meter 204, the altitude meter mounted on the craft can be used. The inertial navigation system 202 applies signals representing the values of $x_t$ and $y_t$ to a azimuth angle operating circuit 206 while the altitude meter 204 applies to signal representing the value of $-z_t$ to the azimuth angle operating circuit 206 which operates equations (7) for applying a signal representing the value $\phi_A(t)$ to the output terminal 208 and a voltage representing the value of $\theta_A(t)$ to an output terminal 209. The detail of the azimuth angle operating circuit 206 will be described later in more detail with reference to FIG. 12.

Referring now to FIG. 12, a $x_t$ signal $E_{30}$ is applied to input terminal 210 converted to one of the stationary windings of resolver 212. A $y_t$ signal $E_{32}$ is applied to input terminal 211 which is connected to the other stationary winding of the resolver 212. An output signal $E_{34}$ from one of the rotary windings of the resolver 212 is supplied to a servo-loop comprising a servo-amplifier, a servo-motor, and a gear train as shown. This servo-loop transmits a rotation corresponding to the azimuth angle $\phi_A(t)$ to the rotary shaft of resolver 220. This rotation is transmitted to the rotary shaft of resolver 212 through a feedback loop indicated by dotted lines. The servo-loop including resolver 212 causes the same to produce an electric vector of the azimuth angle $\phi_A(t)$ from signals $E_{30}$ and $E_{32}$. As a consequence, the shaft of the resolver 212 is rotated by an angle $\tan^{-1}(y_t/x_t)$, that is the azimuth angle $\phi_A(t)$. This angle of rotation coincides with the angle $\phi_A(t)$ given by equation (7). The resolver 220 acting as a synchro transmitter converts the rotation of the azimuth angle $\phi_A(t)$ into a signal $E_{38}$ representing the azimuth angle and supplies this signal to an output terminal 224. An AC source is provided to energize the synchro transmitter 220 by alternating current. A $z_t$ signal $E_{40}$ representing the altitude of the craft is applied to input terminal 213 which is connected to one of the stationary windings of the resolver 226 and the other stationary winding is connected to the other rotary winding of resolver 212 for producing a signal $E_{42}$ representing the magnitude $\sqrt{x_t^2 + y_t^2}$ of the electrical vector formed by signals $E_{30}$ and $E_{32}$. As a consequence, one of the rotary windings of resovers 226 produces an output signal $E_{44}$ representing the angle $$\tan^{-1} \frac{-z_t}{\sqrt{x_t^2 + y_t^2}}$$

of the composite electrical vector of signals $E_{40}$ and $E_{42}$. This output signal $E_{44}$ is applied to the servo-loop comprising a servo-amplifier, a servo-motor and a gear train for transmitting the rotation corresponding to the elevation angle to the rotary shaft of a synchro transmitter 234. This elevation angle is fed back to the shaft of the resolver 226 by a feedback loop indicated by dotted lines. The servo-loop including the resolver 226 computes the elevation angle $\theta_A(t)$ shown in equation (7). The synchro transmitter 234 is energized by alternating current to produce a signal $E_{46}$ representing the elevation angle $\theta_A(t)$ from the alternating voltage $E_{44}$. This signal $E_{46}$ is supplied to an output terminal 238. The azimuth angle signal $E_{38}$ and the elevation angle signal $E_{46}$ produced in this manner by the azimuth angle operation circuit 206 shown in FIGS. 11 and 12 are applied to the coordinate transforming circuit 36 shown in FIG. 9 thus obtaining the azimuth angle $\phi_A(t)$ and the elevation angle $\theta_A(t)$ which are used for the automatic direction control of the repeating antenna.

FIG. 13 is a block diagram showing another example of the azimuth angle self setter 200 shown in FIG. 9, which is characterized by not utilizing the inertial navigation system. The azimuth angle self setter is provided with an integrating circuit for operating equation (10). Another feture of the setter lies in means for correcting the effect of wind upon the helicopter during the flight. These features will become apparent from the following description. An azimuth angle detector 240 of the head of the helicopter is provided to convert the azimuth angle $\phi_A(t)$ of the head into a mechanical angle and to apply the same to a correcting circuit 243 for correcting the velocity with respect to the earth. A circuit 242 for detecting the true velocity relative to air applies a signal $E_{50}$ representing the true velocity of the helicopter relative to air to the correcting circuit 243. The correcting circuit 243 is set with parameters indicating the direction of wind and the velocity of wind provided by navigation weather informations for correcting the true relative speed $V_A(t)$ represented by a signal $E_{50}$ thereby producing a signal $E_{52}$ representing the velocity component $V(t) \cos \phi_A(t)$ along $X_E$ axis of the globe coordinate and a signal $E_{54}$ representing the velocity component $V(t) \sin \phi_A(t)$ along the $Y_E$ axis, said signals $E_{52}$ and $E_{54}$ representing the velocity $V(t)$ of the helicopter relative to the earth.

An initial point setter 246 is provided to determine the coordinate $(x_O, y_O)$ of a predetermined initial point $P_1$ on a prescribed flight course thereby producing a signal $E_{56}$ representing $x_O$ and a signal $E_{58}$ representing $y_O$. The intial point setter 246 produces further a signal $E_{60}$ representing a $X_E$ axis error component $X_e$ corresponding to the flight error cancel by the effect of the wind, and a signal $E_{62}$ representing the $Y_E$ axis error component $y_e$.

The integrating circuit 244 is constructed to calculate the coordinate $P_t(x_t, y_t)$ of the helicopter on the globe coordinate that utilizes the ground office as the origin based on signals $E_{52}$, $E_{54}$, $E_{56}$, $E_{58}$, $E_{60}$ and $E_{62}$ for producing $x_t$ and $y_t$ in terms of mechanical movement and applies these signals to a flight display device 250. The values of $x_t$ and $y_t$ produced by the integrating circuit 244 are given by the following equations (11) which are obtained by modifying equations (10) by taking into consideration the effect of wind $$\begin{aligned}
x_t &= x_0 + \int_0^t V_A(t) \cos \phi_A(t) dt + \\
&\quad \int_0^t V_W(t) \cos \phi_W(t) dt \\
&= x_0 + \int_0^t V(t) \cos [\phi_A(t) - \theta_D(t)] dt \\
y_t &= y_0 + \int_0^t V_A(t) \sin \phi_A(t) dt + \\
&\quad \int_0^t V_W(t) \cos \phi_W(t) dt \\
&= y_0 + \int_0^t V(t) \sin[\phi_A(t) - \theta_D(t)] dt
\end{aligned} \quad (11)$$

Where $\theta_D(t)$ represents an angle between the direction $\phi_A(t)$ of the head of the helicopter and the actual course of the helicopter with respect to the ground and termed a drift angle.

Equations (11) hold true provided that the velocity and the direction of the wind are accurately determined during the flight. In an actual aircraft it is difficult to continuously determine the velocity and the direction of the wind so that the values of $x_t$ and $y_t$ determined by equations (11) involve a large error.

For this reason, it is advantageous to provide means for renewing the initial point $P_O$ for the initial point setter 246. More particularly, a plurality of initial points $P_{01}, P_{02}, \ldots P_{On}$ are preset along a predetermined flight course. Then, each time the helicopter passes through respective initial points the initial values $x_0$ and $y_0$ in equation (11) are renewed to the initial values of respective initial points. As a consequence, each time the helicopter passes through respective initial points, the errors caused by equations (11) are corrected thereby giving correct values of $x_t$ and $y_t$. Such renewal of the initial points can be done by presetting the values of respective initial points in the initial point setter 246 thus producing correct signal each time the helicopter passes respective initial points.

The integrating circuit 244 has another operating mode utilizing the signals $E_{60}$ and $E_{62}$ from the initial point setter 246. More particularly, signal $E_{60}$ provides a forecast error $x_e$ obtainable from the percentage error $e_x$ along $x_e$ axis per unit time which is caused by the effect of the wind in a predetermined section, whereas the signal $E_{62}$ provides a forecast error $y_e$ obtainable from the percentage error $e_y$ along the $Y_E$ axis. The percentage errors $e_x$ and $e_y$ are calculated as the errors per unit time created between the first initial point $P_0$ and the second initial point $P_1$. The values of $x_t$ and $y_t$ for correcting the forecast errors are determined by the following equations $$x_t = x_0 + e_x t + \int_0^t V_A(t) \cos \phi_A(t) dt + \int_0^t V_W(t) \cos \phi_W(t) dt \qquad (12)$$

$$y_t = y_0 + e_y t + \int_0^t V_A(t) \sin \phi_A(t) dt + \int_0^t V_W(t) \sin \phi_W(t) dt$$

Equations (12) hold true when the velocity $V_W(t)$ and direction $\phi_W(t)$ do not vary.

Thus, it can be noted that the integrating circuit 244 has an operation mode given by equations (11) and that given by equations (12).

The flight display device 250 displays the value of $x_t$ and $y_t$ on a flight map in terms. As the flight display device may be used a well known X-Y plotter including a flight map on which the predetermined flight course has been dipicted. In such X-Y plotter, a $X_E$ axis scale 258 and a $Y_E$ axis scale 260 utilizing the ground office as the origin 0 are provided to the movable in parallel. The position of the scale 262 is determined by the value of signal $x_t$ supplied from the integrating circuit whereas the position of the scale 264 is determined by the values of signal $y_t$ supplied from the integrating circuit.

There are also provided a $X_E$ axis setter 252 which sets the origin of the $X_E$ axis scale 258, that is the ground office, and a $Y_E$ axis setter 254 which sets the origin of the $Y_E$ axis scale 260, that is the ground office.

Accordingly, the flight display device can select any ground office as the origin of the globe coordinate, that determine the direction of the repeating antenna.

A subtraction circuit 256 is provided to subtract signals $E_{68}$ and $E_{70}$ representing the coordinate of the ground office displayed by the scale from a signal $E_{64}$ representing the position of $x_t$ displayed by the scale of the flight display device 250 and a signal $E_{66}$ representing the position of $y_t$ displayed by the scale thereby producing a signal $E_{30}$ representing $x_t$ and a signal $E_{32}$ representing $y_t$.

The azimuth angle operating circuit 206 is identical to those shown in FIGS. 11 and 12.

Figure 14:
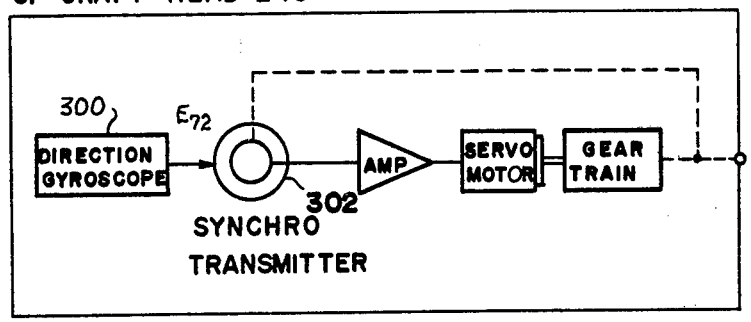
FIG. 14 is a block diagram showing the construction of the azimuth angle detector of the craft head shown in FIG. 13.

FIG. 14 is a block diagram showing the construction of the azimuth angle detector of the craft head 240 shown in FIG. 13. Thus, a direction gyroscope 300 on the helicopter determines the azimuth angle $\phi_A(t)$ of the head of the helicopter to apply a signal $E_{72}$ representing the azimuth andle $\phi_A(t)$ to the stator winding of a synchro transmitter 302. A feedback servo-loop including the synchro transmitter 302, a servo-amplifier, a servo-motor and a gear train shown in FIG. 14 converts the $\phi_A(t)$ signal $E_{72}$ into a rotation corresponding to the azimuth angle of the craft head $\phi_A(t)$. This output is sent to the earth velocity correcting circuit 243 shown in FIG. 13.

Figure 15:
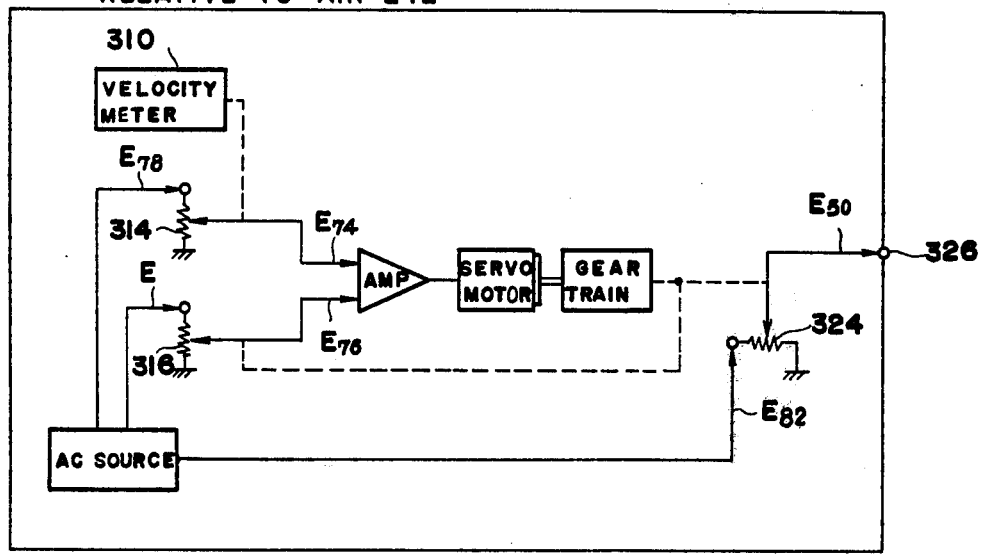
FIG. 15 is a connection diagram, partly in block forms of the detector of the true velocity relative to air shown in FIG. 13.

FIG. 15 is a connection diagram, partly in block forms of the detector of the true velocity relative to air shwon in FIG. 13. A velocity meter 310 mounted on the helicopter drives the sliding arm of a potentiometer 314 through a mechanical connection indicated by dotted lines to produce a velocity signal $E_{74}$ in terms of electric voltage. The velocity meter comprises Pitot-tube for detecting the velocity of the craft compensated for the altitude thereof. One end of potentiometer is connected to one pole of a AC source to be applied with a AC voltage $E_{78}$ corresponding to the full scale of the true velocity relative to air. The velocity signal $E_{74}$ is applied to a servo-loop including a servo-amplifier, a servo-motor, and a gear train. The servo-loop operates the sliding arm of a potentiometer 324 to produce a signal $E_{50}$ representing the true velocity relative to air on an output terminal 326. As shown by dotted lines, the output of this servo-loop is coupled to the sliding arm of another potentiometer 316 to apply a feedback signal $E_{76}$ to the servo-amplifier of the servo-loop. As the servo-amplifier may be used a well known differential input type operational amplifier.

Figure 16:
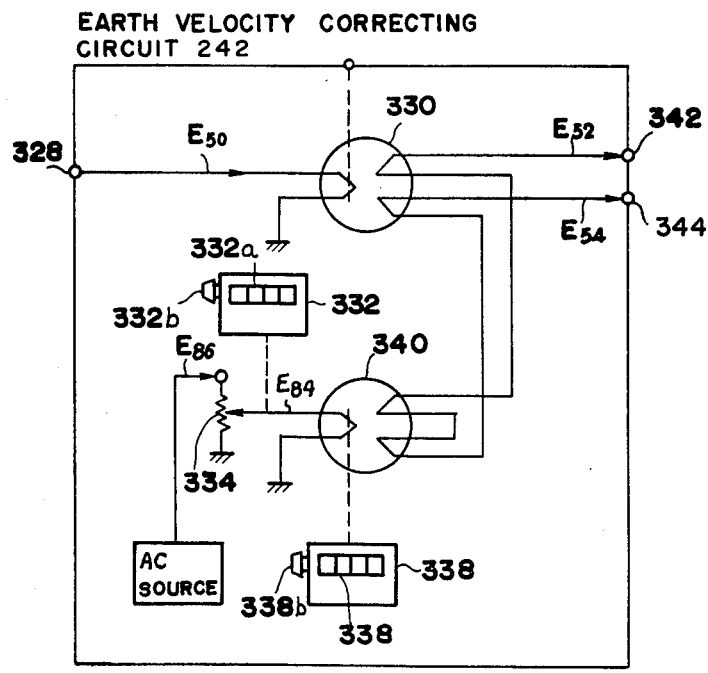
FIG. 16 is a connection diagram showing one example of the earth velocity correction circuit shown in FIG. 13.

FIG. 16 is a connection diagram showing one example of the earth velocity correcting 243 shown in FIG. 13. This circuit is constructed to receive a rotation representing the azimuth angle $\phi_A(t)$ of the craft head from the azimuth angle detector of the craft head 240 shown in FIGS. 13 and 14 and to receive at its input terminal 328 a signal $E_{50}$ representing the true velocity relative to air $V_A(t)$ from the detector of the true velocity relative to air 242. The input terminal 328 is connected to one end of the rotary winding of a resolver 330, and the other end of the rotary winding is grounded. The rotary shaft of the resolver 330 rotates an angel corresponding to the azimuth angle $\phi_A(t)$ of the craft head.

Another resolver 340 functions to operate the weather informations, e.g. the wind velocity $V_W(t)$ and the wind direction $\phi_W$. One end of the rotary winding of the resolver 340 is connected to the sliding arm of a potentiometer 334 to be supplied therefrom with a signal $E_{84}$ representing the value of the wind velocity $V_W(t)$. Setting of the signal $E_{84}$ is performed by moving the sliding arm of the potentiometer 334 by manipulating the knob 332b of a setting device 332 which is provided with a window 332a for displaying the wind velocity $V_W(t)$. A AC voltage $E_{86}$ representing the maximum value of the wind velocity is applied to one terminal of the potentiometer 334 from an AC source. A second setting device 338 is provided with a knob 338b for setting the wind direction $\phi_W$ and a window 338a for displaying the set value of the wind direction. Setting device 338 rotates the shaft of the resolver 340 by an angle corresponding to the wind direction. Two stationary windings of the resolver 340 are connected in series and are cumulatively connected with the stationary windings of the resolver 330 whereby the resolver 330 produces an electrical vector representing the velocity with respect to the earth which is corrected for the true velocity with respect to air. Thus, a $X_e$ axis component signal $E_{52}$ and a $Y_E$ axis component signal $E_{54}$ of the velocity relative to earth $V(t)$ are applied to output terminals 342 and 344 respectively of the resolver 330 wherein signal $E_{52}$ represents $$V(t) \cos \phi(t) = V_A(t) \cos \phi A(t) + V_W \cos \phi_W,$$

and signal $E_{54}$ represents $$V(t) \sin(t) = V_A(t) \sin \phi_A(t) + V_W \sin \phi_W.$$

Figure 17:
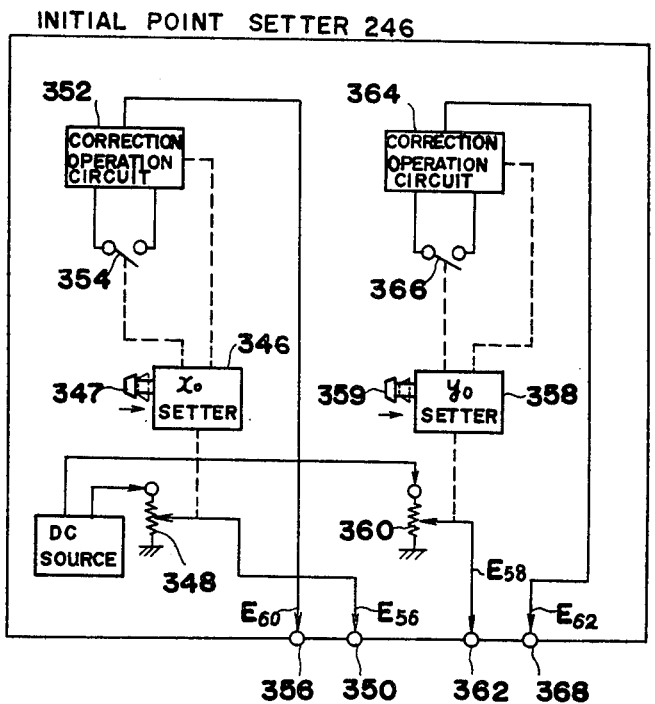
FIG. 17 is a block diagram showing one example of the initial point setter shown in FIG. 13.

FIG. 17 is a block diagram showing one example of the initial point setter 246 shown in FIG. 13 which comprises a setter 346 for setting the values of $x_0$ of the initial point $P_0(x_0, y_0)$, a potentiometer 348, a set-up relay switch 354, a correction operation circuit 352, a setter 358 for setting the values of $y_0$ and having the same construction as setter 346, a potentiometer 360, a set-up relay switch 366 and a correction operation circuit 364.

The initial point setting operation and the error correction operation of the initial point setter 246 will be described with regard to the $X_E$ axis component. At first, the knob 347 of the $x_0$ setter 346 is manually operated to move the scale 262 of the flight display device 250 shown in FIG. 13 to any initial points. The rotation of the knob 347 moves the sliding arm of the potentiometer 348 to produce a signal $E_{56}$ representing the $X_E$ axis initial point on an output terminal 350. This signal $E_{56}$ is applied to the integrating circuit 244 shown in FIG. 13 to drive its servo-loop thus moving the scale 262 of the flight display device 250 to the initial point $P_0$. When the helicopter passes through the initial point $P_O$ the knob 347 of the $X_0$ setter is pushed back in the direction of an arrow. Then a set-up relay (not shown) contained in the $X_0$ setter 346 is made ON or OFF, thus opening or closing the set-up relay switch 354. The ON-OFF opertion of this switch triggers the correction operation circuit 352 whereby a counter (not shown) contained therein begins to count the time elapse from the initial point $P_0$. Then, at the time when the helicopter reaches the second initial point $P_1$ if the positions of the second initial point and the scale of the flight display device 250 do not coincide with each other, the operator rotates the knob 347 to coincide the scale with the second initial point. The movement of this time gives the $X_e$ axis error $x_e$ which is transmitted to the correction operation circuit 352 as shown by dotted lines. Concurrently with the adjustment of the second initial point by turning the knob 347, it is pushed back twice to cause the set up relay switch 354 to open and close twice. The first opening and closing operations of switch 354 reset the counter of the correction operation circuit 352 thus writing error $x_2$ and the interval until the counter is reset into the operating unit to calculate and store the percentage of error in the direction of $X_E$ axis. Concurrently therewith the percentage error which has been stored before is reset. At the next opening and closing operations, the counter again begins to count the time and the correction operation circuit 352 applied a signal $E_{60}$ representing the error expected to occur from the stored percentage error $e_x$ subsequent to the second initial point.

The setting of the initial point and the error correction operation of the $Y_E$ axis component are performed in the same manner by the setter 358, the potentiometer 360, the operation correction circuit 364 and the set-up relay switch 366.

The operation correction circuit 352 and 364 may employ micro-processors, for example, type 4040 or 8080 manufactured by Intel Corporation. In these microprocessors, are stored the operation programs of $e_x = x_e/(t_1 - t_0)$ and $e_y = y_e/(t_1 - t_0)$ as fixed memories. Further, these processors include time counters.

Figure 18:
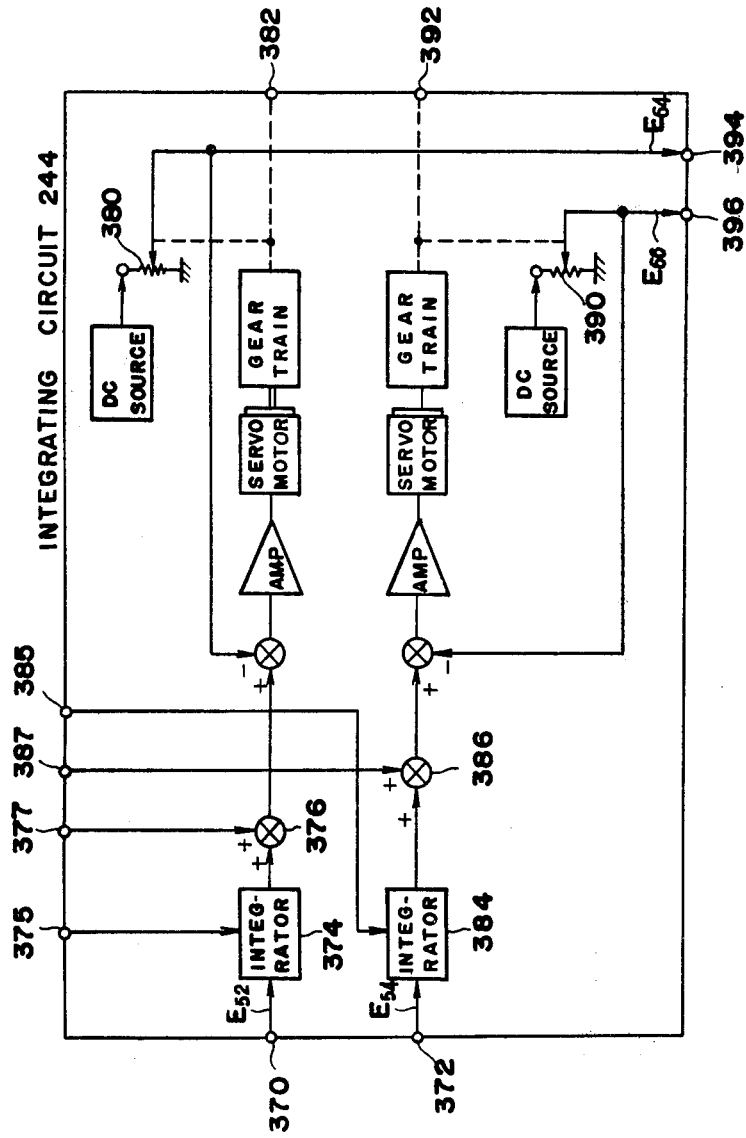
FIG. 18 is a block diagram showing one example of the integrating circuit shown in FIG. 13.

FIG. 18 is a block diagram showing one example of the integrating circuit 244 shown in FIG. 13. A signal $E_{52}$ from the earth velocity correcting circuit 243 is applied to an input terminal 370 and an input 370 is coupled directly to an integrator 374 which computes the integration terms in equation (11) or (12). When the $X_e$ axis forecast error signal $E_{60}$ is applied to terminal 375, the integrator 374 performs the operation of the second term in equation (12). For this reason, the integrator 374 is constituted by two cascade connected operational amplifiers. As the first stage operational amplifier may be used an analogue integrator described on pages 213–218 of "Operational Amplifier" published in 1971 by Burr-Brown Research Corporation, while as the second stage operation amplifier may be used a differential amplifier described in pages 205–207 of the same reference. Integrator 384 has the same construction. The output from integrator 374 is added to the initial point signal $E_{56}$ from an input terminal 377 by an adder 376. A servo-loop comprising a feedback loop, a servo-amplifier, a servo-motor and a gear train gives the amount of movement of the scale 262 of the flight display device 250 shown in FIG. 13. The output of this servo-loop also moves the sliding arm of a potentiometer 380 as indicated by dotted lines thus producing a signal $E_{64}$ representing position of the scale 262 of the flight display device 250 on an output terminal 394.

The signal $E_{54}$ from the earth velocity correcting circuit 243 is applied to an input terminal 372 coupled to the integrator 384, and the $Y_E$ axis forcast error signal $E_{62}$ is applied to an input terminal 385. Accordingly, the integrator 384 computes the integration term in equation (11) or (12). The output from the integrator 384 is added to the initial point signal $E_{58}$ from input terminal 387 by an loop 386. A servo-loop comprising a feedback adder, a servo-amplifier, a servo-motor and a gear train gives the amount of the movement of scale 264 of the flight display device 250 shown in FIG. 13. Thus, servomotor operates the sliding arm of a potentiometer 390 as shown by dotted lines to produce a signal $E_{66}$ representing the position of the scale 264 of the flight display device on output terminal 396.

Figure 19:
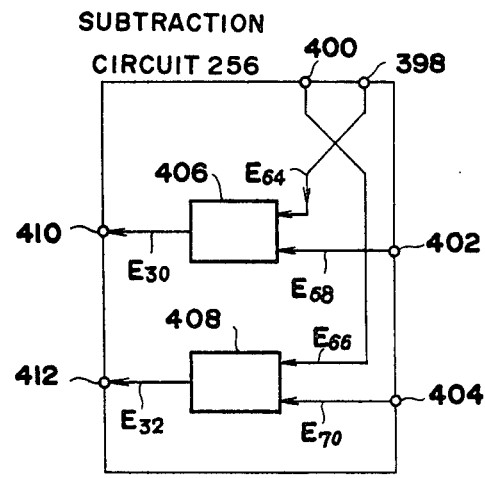
FIG. 19 is a block diagram showing one example of the subtraction circuit shown in FIG. 10.

FIG. 19 is a block diagram showing one example of the substraction circuit 256 shown in FIG. 13. The subtraction circuit comprises two subtractors 406 and 408 each consisting of a differential type operational amplifier. One input terminal 398 of the subtractor 406 is supplied with a signal $E_{64}$ while the other input terminal 402 a position signal $E_{68}$ representing the position of the $X_E$ axis scale 258 of the flight display device that represents the ground office or the origin thereby producing on an output terminal 410 a $x_t$ signal $E_{30}$ given by equation (11) or (12). One input terminal 400 of the subtractor 408 is supplied with a signal $E_{66}$ whereas the other input terminal 404 a position signal $E_{70}$ representing the position of scale 260 of the flight display device which represents the ground office or the origin thereby producing a signal $E_{32}$ given by equation (11) or (12) on an output terminal 412.

As can be clearly noted from the foregoing descriptions regarding FIG. 14 through FIG. 19, the direction self setting circuit shown in FIG. 13 computes the position $P_t(x_t, y_t, -z_t)$ of the helicopter from flight informations provided by the altitude meter and the velocity meter mounted on the helicopter, and the weather informations regarding the direction and velocity of the wind thereby producing an output signal representing the azimuth angle $\phi_A(t)$ and the elevation angle $\theta_A(t)$ which represent the direction of the repeating antenna on the globe cordinate.

Thus, by mounting an air-borne station provided with the direction angle self setting circuit described above on an aircraft it is possible to produce an automatic direction control system that enables to simplify the equipment of the ground station in a ground office to which television video signals are repeated from an antenna on the aircraft.

What is claimed is:

1. An automatic television antenna directing and tracking system comprising
   1. a repeating antenna mounted on an aircraft for repeating television video signals to a ground office;
   2. an air-borne station mounted on a said aircraft and including a control system for automatically directing and antenna toward said ground office, said control system including direction angle setting means, coordinate transforming means and an antenna driving unit, said direction angle setting means comprising means for giving the azimuth angle and the elevation angle on the longitudinal-latitude coordinate as measured from said ground office to said coordinate transforming means for directing said repeating antenna toward said ground office, said coordinate transforming means including means for transforming the azimuth angle and the elevation angle on the longitude-latitude coordinate into the azimuth angle and the elevation angle on the air-borne coordinate based on the azimuth angle of the craft head, pitching angle and the rolling angle of said aircraft, and said antenna driving unit including a servo-loop containing a servo-motor and a gear train for rotating the azimuth angle shaft and the elevation angle shaft of said repeating antenna, and
   3. a ground station in said ground office including a repeating receiving installation having a receiving parabola antenna, a tracking installation having a tracking parabola antenna and an angle command communication means, said tracking installation including means for directing said receiving parabola antenna of the repeating receiving installation toward said air-borne station, and said angle command communication means including means for detecting the azimuth angle and the elevation angle of said tracking parabola antenna of said tracking installation and means for transmitting an angle command signal to said air-craft.

2. The automatic television antenna directing and tracking system according to claim 1 wherein said air-borne station comprises means for transforming a unit vector represented by an azimuth angle $\phi_A(t)$ and an elevation angle $\theta_A(t)$ given by said direction angle setting means on the longitude-latitude coordinate utilizing said repeating antenna as the origin into three axes rectangular coordinate components $(x_E, Y_E, -z_E)$, means for transforming said rectangular coordinate components into three axes rectangular coordinate components $(x_B, y_B, -z_B)$ on an air-borne coordinate and means for transforming said rectangular coordinate components $(x_B, y_B, -z_B)$ into the azimuth angle $\phi_B(t)$ and the elevation angle $\theta_B(t)$ of said repeating antenna.

3. The automatic television antenna directing and tracking system according to claim 1 wherein said air-borne station further comprises means for switching the transformation of said three axes rectangular components $(x_B, y_B, -z_B)$ of the unit vector on the air-borne coordinate between the azimuth angle $\phi_B(t)$ and the elevation angle $\theta_B(t)$ of the repeating antenna, and the rolling angle $\phi_B(t)$ and the elevation angle $\rho_B(t)$ of said repeating antenna, thereby eliminating the dead point locking thereof.

4. The automatic television antenna directing and tracking system according to claim 1 wherein said air-borne station further comprises automatic gain control means for imparting a loop gain proportional to $1/\cos \theta_B(t)$ to a servo-loop including a servo-motor for the azimuth axes of said repeating antenna, where $\theta_B(t)$ represents the elevation angle of said repeating antenna.

5. An automatic television antenna directing and trackin system comprising
   1. a repeating antenna mounted on an aircraft for repeating television video singals to a ground office,
   2. an air-borne station including an antenna driving unit for automatically directing said repeating antenna toward said ground station, direction angle self setting means and coordinate transforming means, said direction angle self setting means including means responsive to a flight information for applying to said coordinate transforming means an azimuth angle and an elevation angle required to direct said repeating antenna toward said ground office, said coordinate transforming means transforming the azimuth angle and the elevation angle on the longitude-latitude coordinate into the azimuth angle and the elevation angle on the air-borne coordinate based on the azimuth angle of the craft head, the pitching angle and the rolling angle of said aircraft, and said antenna driving unit including servo-loops respectively containg a servo-motor and a gear train for rotating the azimuth shaft and the elevation shaft of said repeating antenna, and
   3. a ground station in said ground office, and ground station including a receiving installation provided with a receiving parabola antenna, and a tracking installation provided with a tracking parabola antenna and means for directing said receiving parabola antenna of said receiving installation toward said aircraft.

6. The television antenna automatic direction and tracking system according to claim 8 wherein said direction angle self setting means comprises means responsive to a flight information of said aircraft for obtaining the positin coordinate $(x_t, y_t, -z_t)$ of said aircraft, and means for operating the azimuth angle $\phi_A(t)$ and the elevation angle $\theta_A(t)$ of said aircraft in accordance with equations $$\phi_A(t) = \tan^{-1} \frac{y_t}{x_t}$$

and $$\theta_A(t) = \tan^{-1} \frac{-z_t}{(x_t^2 + y_t^2)^{\frac{1}{2}}}$$

7. The automatic television antenna directing and tracking system according to claim 6 wherein said direction angle self setting means further comprises an inertial navigation system for obtaining the values of $x_t$ and $y_t$, and an altitude meter for producing the value of $-z_t$.

8. The automatic television antenna directing and tracking system according to claim 6 wherein said direction angle self setting means comprises an operation means for determining said position coordinate in accoording with equations $$x_t = x_0 + \int_0^t V(t) \cos \phi_E(t) dt$$

$$y_t = y_0 + \int_0^t V(t) \sin \phi(t) dt$$

where $V(t)$ represents the velocity of the aircraft with respect to the earth, $\phi_E(t)$ the angle of the flight course with respect to the earth, and $(x_O, y_O)$ the position coordinate of an initial point on a predetermined position of the flight course.

9. The automatic television antenna directing and tracking system according to claim 6 wherein said direction self angle setting means comprises computing means for determining the position coordinate $(x_t, y_t)$ of said air-craft for correcting the effect of wind in accordance with the equations $$x_t = x_0 + \int_0^t V_A(t) \cos \phi_A(t) dt + \int_0^t V_W \cos \phi_W dt$$

$$y_t = y_0 + \int_0^t V_A(t) \sin \phi_A(t) dt + \int_0^t V_W \sin \phi_W dt$$

where $x_O$ and $y_O$ represents the coordinate of a predetermined initial point on a prescribed flight course, $V_A(t)$ the true velocity of the aircraft, $\phi_A$ the azimuth angle of the head of the aircraft, $\phi_W$ the direction of the wind provided by navigation weather information and $V_W$ the velocity of wind provided by navigation weather information.

10. The automatic television antenna directing and tracking system according to claim 8 wherein said direction angle self setting means comprises error correction means which successively changes and initial point having a coordinate $(x_O, y_O)$ to one of a plurality of initial points predetermined along the flight course of said aircraft.

11. The automatic television antenna directing and tracking system according to claim 5 wherein said direction angle self setting means comprises error correction means which successively changes said initial point having a coordinate $(x_O, y_O)$ to one of a plurality of initial points predetermined along the flight course of said air-craft.

* * * * *